United States Patent
Jin et al.

(10) Patent No.: US 8,200,963 B2
(45) Date of Patent: Jun. 12, 2012

(54) COMBINATION-BASED BROADCAST ENCRYPTION METHOD

(75) Inventors: Weon-il Jin, Suwon-si (KR); Dae-youb Kim, Seoul (KR); Hwan-joon Kim, Seoul (KR); Sung-joon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1597 days.

(21) Appl. No.: 11/311,256

(22) Filed: Dec. 20, 2005

(65) Prior Publication Data

US 2007/0140483 A1 Jun. 21, 2007

(30) Foreign Application Priority Data

Dec. 31, 2004 (KR) ........................ 10-2004-0117701

(51) Int. Cl.
*H04L 29/06* (2006.01)
(52) U.S. Cl. ................ 713/163; 726/4; 726/27; 380/28; 380/201
(58) Field of Classification Search ........................ None
See application file for complete search history.

(56) References Cited

U.S. PATENT DOCUMENTS 5,592,552 A * 1/1997 Fiat .............................. 713/163

OTHER PUBLICATIONS

"The Key Establishment Problem," Blundo et al., Feb. 19, 2004, Foundations of Security Analysis and Design (FOSAD) 2001/2002.*
"Secure Group Communications and Hierarchical Access Control," Zou, University of Nebraska, Lincoln, Nebraska, Dec. 2000.*

* cited by examiner

*Primary Examiner* — Oscar Louie
(74) *Attorney, Agent, or Firm* — Sughrue Mion, PLLC

(57) ABSTRACT

A combination-based broadcast encryption method includes: assigning by a server a base group of different combinations to each user; producing and sending secret information for each user by using as a base the base group allocated to each user; producing and sending an inverse-base parameter value through calculations with integers used to produce the base group and key value information of one or more privileged users; and deriving a group key by using the key value information of the privileged users, encrypting a session key by using the derived group key, and sending the encrypted session key to each user. Accordingly, each user is assigned a different base through a combination, thereby having security against collusion attacks.

50 Claims, 9 Drawing Sheets

GROUPING A USER SET

RE-GROUPING EACH GROUP

COMBINATION-BASED BROADCAST ENCRYPTION METHOD

CROSS-REFERENCE TO RELATED APPLICATIONS

This application claims priority from Korean Patent Application No. 2004-117701, filed on Dec. 31, 2004, the entire contents of which are incorporated herein by reference.

BACKGROUND OF THE INVENTION

1. Field of the Invention

The present invention relates a broadcast encryption method, and more particularly, to a broadcast encryption method being secure against collusion attacks.

2. Description of the Related Art

In general, the encryption systems are classified into a symmetric key (also referred to as a secret key) encryption system and an asymmetric key (also referred to as a public key) encryption system.

The symmetric key encryption system uses the same key for encryption and decryption. For example, if a sender converts an original message into an encrypted message through an encryption key and an encryption algorithm and sends the encrypted message to a receiver, the receiver converts the encrypted message into the original message by applying the same key to a decryption algorithm.

The receiver has to exchange keys safely prior to the encrypted communications, and a third party who attempts to view the encrypted communications can not view the original message without the keys that the sender and receiver have used. However, problems on key management and exchanges can occur since the number of keys to be managed accordingly increases if encrypted messages are to be sent to more parties.

Compared to the symmetric key encryption system, the asymmetric key encryption system is based on mathematical functions, in which there exists a pair of keys, wherein one of the keys is open to anyone else for its use, and the other key is kept secret. In here, the open key is referred to as a public key, and the secretly-kept key is referred to as a private key.

In order for a sender and a receiver to perform encryption communications by using the public key, the sender first encrypts an original message by using a public key of the receiver to send the encrypted message to the receiver, and the receiver decrypts the encrypted message by using a private key of his own to obtain the original message. Even though someone gets an encrypted message on a network, data can be safely sent since the encrypted message can not be decrypted without the private key which is kept by its owner all the time and has no need to be open or sent to others.

On the other hand, the symmetric key (or cipher) is mainly used to encrypt or decrypt broadcast streams, because the encryption and decryption can be carried out very rapidly when the symmetric key is used and the symmetric key can be safely sent through a limited access system to which only authenticated are accessible.

Contents creators create various useful data such as audio and video data in a data transmission system based on general broadcast encryptions, and provide the created data with service providers. The service providers broadcast the data of the contents creators through various wire and wireless communication networks to authorized users such as smart home Digital Rights management (DRM) networks and mobile DRM networks.

FIG. 1 is a view for showing a general broadcast transmission system. In FIG. 1, a service provider 100 produces a broadcast message 110 and sends the broadcast message 110 to users through various transmission channels 120. In here, the broadcast message 110 is sent to privileged users 130 as well as to revoked users. Thus, the service provider 100 allocates a separate key to encrypt the broadcast message 110 in order for the privileged users 130 to read the sent broadcast message 110. Therefore, an important issue in the broadcast system is the method of producing a certain group key in order for only the privileged users 130 to decrypt the encrypted broadcast message.

For example, the service provider 100 can send data through satellites to users devices such as set-top boxes coming with various satellite receivers, as well as send the data to mobile communication terminals through mobile communication networks. Further, the service provider 100 can send the data to various terminals on a smart home network through the Internet.

On the other hand, the service provider 100 encrypts the data by using broadcast encryption (BE) to prevent unauthorized users from using the data.

The security in such an encryption/decryption system mainly depends on a system for managing encryption keys. Further, methods for deriving keys is most important in such an encryption key management system. In addition, it is important to manage and update the derived encryption keys.

On the other hand, the data transmission method by using the public key is a method for sending data including key values of authorized users when data is sent. That is, data sent by the service provider 100 through broadcast/home networks contains a header portion having authentication information and an encrypted data portion having substantial data information.

Thus, the header portion contains a group identifier (ID) and key value information of authenticated users included in each authorized group so that, of plural users, data can be sent to only the users of the authorized groups.

Therefore, if data is encrypted and sent through a certificate revocation list/online certificate status protocol (CRL/OCSP) including a CRL and OCSP information, users receiving the data check their own key value information included in the header portion of the data, get authenticated in due course, and use their desired data.

On the other hand, the header portion in the broadcast encryption (BE) scheme contains only information of a group ID and a key value for a certain group. Thus, the privileged users of authenticated groups can use their own group key values in order to decrypt the received data into original data.

There exist methods disclosed in the "Broadcast Encryption" (Fiat et al., Crypto '93 LINCS vol. 839, pp 480-491, which is, hereinafter, referred to as the "Fiat algorithm") as the other methods for broadcasting encryption keys. The 'Fiat algorithm' proposes two basic broadcast encryption algorithms and an algorithm having higher security against collusion attacks.

Hereinafter, a brief description will provided for the Fiat algorithm. Coefficients are first defined as below for the description of the Fiat algorithm.

U: Set of users with $|U|=n$
P: Set of privileged users with $|U-P|=r$
N: RSA composite
$y_1, \ldots, y_n$: Distinct primes
$usr_i$: An user in U where $1 \leq i \leq n$
O: A positive integer satisfying $1<O<N$ The Fiat algorithm enables a server to produce system coefficients N, $y_1, \ldots, y_n$, and O, of the defined coefficients, in the system initialization step, and discloses the coefficients N, $y_1, \ldots, y_n$, of the system coefficients, in order for anyone to look them up. Further, if a user $usr_i$ subscribes to services, the server carries out tasks as below:

1. assign a value $y_i$ to a user $usr_i$
2. calculate secret information, $u_i = O^{y_i(mod\ N)}$, of the user $usr_i$
3. send the calculated secret information safely to the user $usr_i$ The initialization and user subscription steps are completed through the above tasks. Now, if given a group of privileged users, $P \subset U$, a group key $K_p$ for each user is expressed in Equation 1 as follows:

$$K_p = O^{\prod_{usr_s \in P} y_s} (mod\ N) \qquad \text{[Equation 1]}$$

Users included in P can use the value $u_i$ assigned from the server to calculate the group key $K_p$ of Equation 1 by using Equation 2 as follows:

$$K_p = u_i^{\prod_{usr_s \in P-(usr_i)} y_s} (mod\ N) \qquad \text{[Equation 2]}$$

Unauthorized subscribers or revocaters who are not normal subscribers have, in the exponent part $u_i$, the distinct prime $y_i$ not included in the exponent part of $K_p$, so the group key $K_p$ can be calculated when the distinct prime $y_i$ is eliminated from the exponent part.

However, the calculation is practically impossible due to a problem of 'difficult prime factorization of N'. Thus, the broadcast encryption becomes possible for privileged users through the above method.

However, the above Fiat algorithm causes a serious security problem when two users, for example, $usr_1$ and $usr_2$, share the secret information each other. That is, since $y_i$ and $y_j$ are primes to each other, integers a and b satisfying $ay_i+by_j=1$ can be easily obtained. Therefore, the two users can obtain a value of O being the secret system information by using Equation 3 as below:

$$u_i^a u_j^b = O^{ay_i+by_j} = O(mod\ N) \qquad \text{[Equation 3]}$$

Thus, the unauthorized users can obtain the group key $K_p$ in all circumstances by using the value of O. That is, if two malicious users collude with each other, the two basic algorithms cause the system to be insecure any further since the secret information of a server broadcasting contents is oozed out.

As above, systems referred to as "1-resilient systems" are ones secure against one aggressive operator but not secure against two aggressive operators. On the other hand, the Fiat algorithm proposes a k-resilient system based on the 1-resilient system, but has a problem of high inefficiency.

The k-resilient system is that receivers (t receivers at maximum) eliminate an arbitrary number of receivers colluding with one another. However, the method needs a relatively long message, a relatively many keys stored in a receiver, and more-than-once decryption operations by each receiver.

Further, the method does not take a stateless receiver scenario into consideration. There needs to avoid an assumption on how many receivers collude with one another. Further, the message size and the number of stored keys need to be minimized, and the decryption operations to be carried out by a receiver have to be minimized for optimal performance.

On the other hand, the other systems like the Fiat system do not provide the stateless receiver scenario, so that the other systems can not be effectively applied to the protection of contents on recording media.

SUMMARY OF THE INVENTION

According to an aspect of the present invention, there is provided a combination-based broadcast encryption method, comprising steps of producing a base group through combinations of more-than-one integers out of plural different integers, and assigning the base group of different combinations to each user; producing secret information for each user through calculations with key value information allocated to a corresponding user by using as a base the base group allocated to each user, and sending the produced secret information to each user; producing an inverse-base parameter value through calculations with an integer used to produce the base group and key value information of one or more privileged users, and sending the produced inverse-base parameter value to each user, in order for only the privileged users of plural users to eliminate the base group from the secret information; and deriving a group key by using the key value information of the privileged users, and encrypting a session key with the derived group key and sending the encrypted session key to each user.

The integers for producing the base group are coprimes.

The inverse-base parameter value is calculated with one or more random numbers further included for security reasons.

Further, the one or more random numbers calculated in the inverse-base parameter value are used for calculation for deriving the group key.

The server produces a server-own random value, and the secret information for each user is calculated with the produced server's own random value included.

The one or more random numbers calculated in the inverse-base parameter value is calculated with the server's own random value, and then sent to each user.

The produced base of the secret information for each user contains a base group allocated to each user and a common integer commonly used for all users, and the group key is derived to have the base of the common integer.

The server sends, to each user, information of combinations for producing a corresponding base group.

The server sends information of a key value allocated to the user every time a broadcast message is sent.

According to an aspect of the present invention, there is provided a combination-based broadcast encryption method, comprising steps of grouping by a server into plural groups one upper group of plural users receiving a broadcast message, and assigning a key value to corresponding users of each group; producing a base group for each group through combinations of more-than-one integers of plural different integers, and assigning users of each group the base group produced through a different combination; producing an inverse-base parameter value through calculations with integers used to produce the base group and key value information of one or more privileged users, and sending the produced inverse-base parameter value to users of a corresponding group, in order for only the privileged users of the plural users to eliminate the base group from the secret information; and deriving a group key for each group with the key value information of the privileged users, encrypting a session key with the derived group key, and sending the encrypted session key to each user.

A random number is assigned to each group, and the random number is further included in calculating the secret information of each user to be sent to the users of each group.

A random number assigned to a corresponding group is further included in calculating the inverse-base parameter value.

The group key for each group is calculated with a random number assigned to a corresponding group further included.

Integers for productions of the base group are coprimes.

The inverse-base parameter value is calculated with one or more random numbers further included for security reasons.

One or more random numbers calculated in the inverse-base parameter value are used to calculate for derivation of the group key.

The server produces a server's own random number, and the produced server-own random number is further included in calculating the secret information for each user.

One or more random numbers calculated in the inverse-base parameter value are calculated with the server's own random number, and sent to each user.

The produced base of the secret information for each user contains a base group assigned to each user and a common integer commonly used for all users, and the group key is derived to have the base of the common integer.

The server sends, to each user, the information of combinations for producing a corresponding base group.

The server separately calculates an exponent part and a base part in calculating the inverse-base parameter value, and separately sends the exponent part and base part of the calculated inverse-base parameter value.

Each group is grouped to plural sub-groups, a key value is assigned to users of each sub-group, and secret information for each user is produced through calculations with key value information assigned to users of each sub-group.

If there are no unauthorized users in a specific group of the groups, a separate key value assigned to each group is established as a group key to the corresponding group.

The server sends the key value information assigned to the users every time the server sends the broadcast message.

According to an aspect of the present invention, there is provided a combination-based broadcast encryption method, comprising steps of producing a base group through combinations of more-than-one integers of plural different integers, and allocating the base group produced through a different combination for each user; producing secret information for each user through calculations with a key value information allocated to a corresponding user by using as a base the base group allocated to each user, and receiving by each user the produced secret information for each user from a server; producing an inverse-base parameter value through calculations with integers used to produce the base group and the key value information of one or more privileged users, and receiving by each of the users the produced inverse-base parameter value from the server, in order for only the privileged users of plural users to eliminate the base group from the secret information; calculating a group key by using the secret information for each user received from the server and the inverse-base parameter value; and decrypting a session key received from the server by using the calculated group key.

The integers for producing the base group are coprimes.

Further, the inverse-base parameter value is calculated with one or more random numbers further included for security reasons.

In here, one or more random numbers calculated in the inverse-base parameter value are used for calculations to derive the group key.

The server produces a server's own random number, and the secret information for each user is calculated with the produced server-own random number included.

One or more random numbers calculated in the inverse-base parameter value are calculated with the server's own random number, and then received.

A base of the produced secret information for each user contains the base group assigned to each user and a common integer commonly used for all users, and the group key is derived by using the common integer as a base.

In here, each user receives, from the server, information of a combination for producing the corresponding base group.

The information of the key value assigned to each user is received from the server every time the broadcast message is sent.

According to an aspect of the present invention, there is provided a combination-based broadcast encryption method, comprising steps of grouping into plural groups one upper group having plural users receiving a broadcast message, and assigning a key value to users of each group; producing a base group for each group through combinations of more-than-one integers of plural different integers, and assigning each user of each group the base group produced through a different combination; producing secret information for each user through calculations with key value information assigned to users of each group by using as a base the base group assigned to each user, and receiving by each user from a server the produced secret information for each user; producing an inverse-base parameter value through calculations with the integers used to produce the base group and the key value information of one or more privileged users of the plural users, and receiving the produced inverse-base parameter value by users of each corresponding group from the server, in order for only the privileged users of the plural users to eliminate the base group from the secret information; calculating a group key for each group by using the secret information for each user received from the server and the inverse-base parameter value; and decrypting a session key received from the server by using the calculated group key for each group.

A random number is assigned to each group, and the random number is further included in calculating the secret information of each user to be sent to the users of each group.

A random number assigned to the corresponding group is further included in calculating the inverse-base parameter value.

The group key for each group is calculated with a random number assigned to the corresponding group further included.

Integers for productions of the base group are coprimes.

The inverse-base parameter value is calculated with one or more random numbers further included for security reasons.

One or more random numbers calculated in the inverse-base parameter value are used to calculate for derivation of the group key.

The server produces a server's own random number, and the produced server-own random number is further included in calculating the secret information for each user.

One or more random numbers calculated in the inverse-base parameter value are calculated with the server's own random number, and received by each user.

A base of the produced secret information of each user contains a base group assigned to each user and a common integer commonly used for all users, and the group key is derived to have the base of the common integer.

Users of each group receive from the server the information of combinations for producing the corresponding base group.

An exponent part and a base part are separately calculated in calculating the inverse-base parameter value, and the exponent part and base part of the calculated inverse-base parameter value are each received from the server.

Each group is grouped to plural sub-groups, a key value is assigned to corresponding users of each sub-group, and secret information for each user is produced through calculations with key value information assigned to the corresponding users of each sub-group.

If there are no unauthorized users in a specific group of the groups, a separate key value assigned to each group is established as a group key to the corresponding group.

The key value information assigned to the users is received from the server every time the server sends the broadcast message.

In the conventional Fiat algorithm as above, the secret information of $u_i = O^{y_i} (\mod N)$ that the Fiat algorithm provides to individual users contains one variable O and one equation. This enables the variable O to be calculated according to the theory, that is, the Information theory. However, if N is a composite number of two large primes, it is impossible to obtain the variable O according to the computation theory due to the difficulties of prime factorization. Considering the above, the Fiat algorithm can be referred to as the 1-resilient system. On the contrary, if given the secret information $u_i$ and $u_j$ of two users as above, one variable and two equations are obtained, so it can not be said that the difficulties of prime factorization is applied even to here. Therefore, two substantially colluding users can easily calculate the variable O.

Since the Fiat algorithm has every user use the same base, that is, the variable O, the present invention assigns a different base to each user in order to overcome the exposure to collusion attacks. To do so, the present invention uses 'combinations'. Further, an additional mechanism is proposed to deal with revocators according to a modified exemplary embodiment of the present invention.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
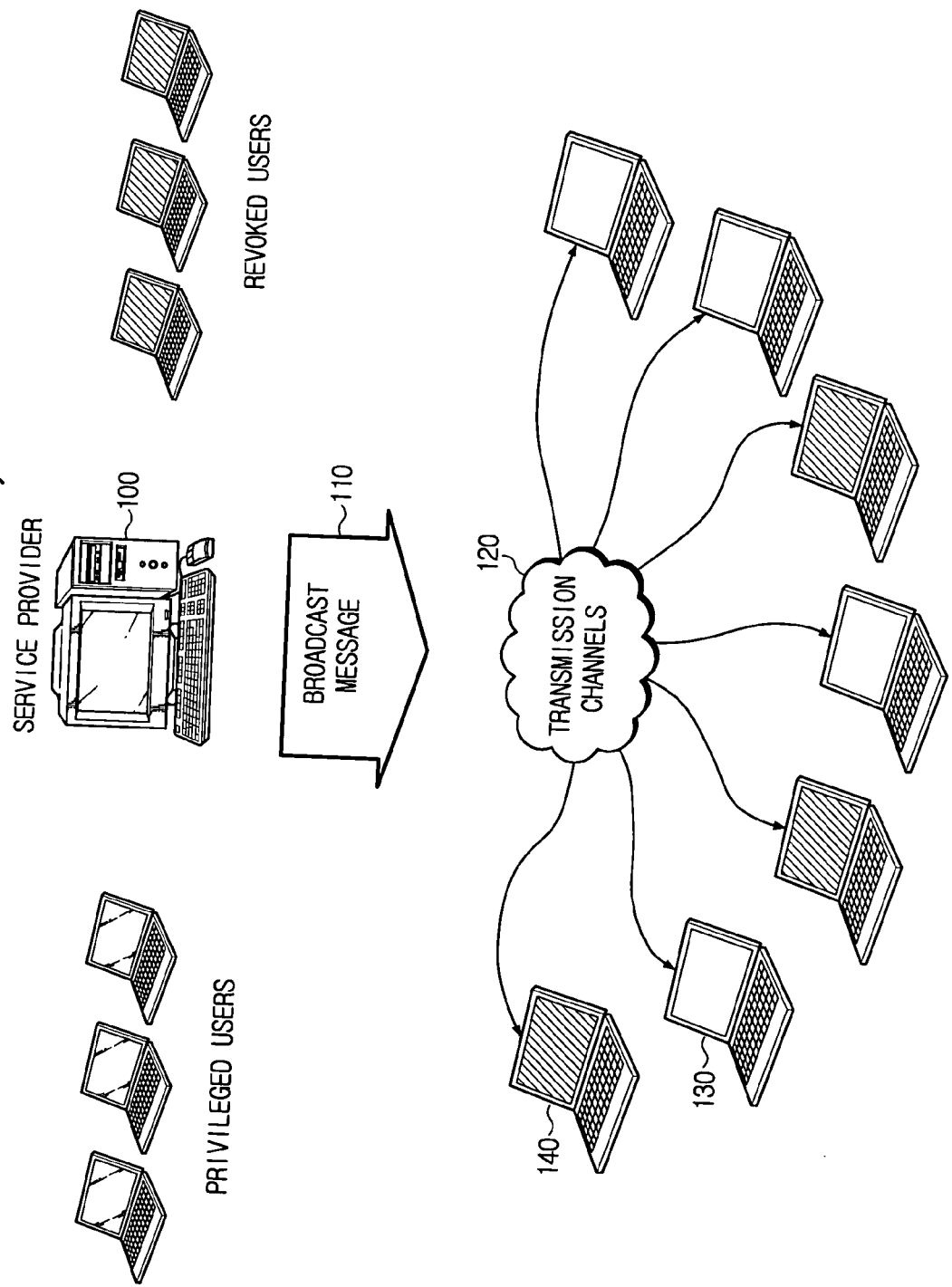
FIG. 1 is a view for showing a general broadcast transmission system.

Hereinafter, description will be made on a method assigning a base to individual users according to the present invention.

First, C integers, $O_1, \ldots, O_c$, have values larger than 1 but smaller than N ($1 < O_s < N$), and satisfy $\gcd(O_s, N) = 1$. The number of different combinations is ${}_C C_d$ when d numbers are chosen from these C integers. Instead of a variable O as a base of the secret information of each user, d integers are multiplied to produce a base group, and the use of the produced base group, that is, $O_{\sigma i(1)}, \ldots, O_{\sigma i(d)}$, enables a system to be secure against methods attacking the Fiat algorithm. However, the many multiplications of integers fail to guarantee security against a few users' collusions since more equations than the number of variables can be provided. Thus, enough equations should not be provided in order for security to be guaranteed. That is, preparations can be made against all possible attacks by avoiding the use of all ${}_C C_d$ combinations.

Hereinafter, description will be made on a combination-based broadcast encryption method according to the basic exemplary embodiment of the present invention.

Prior to description on a basic exemplary embodiment of the present invention, coefficients necessary for the description on the basic exemplary embodiment are defined as below.

U: set of users with $|U| = n$
P: set of privileged users with $|U-P| = r$
N: RSA composite
ω, ν: random numbers
z: a large integer
κ: a session key
O: a positive integer satisfying $1 < O < N$
$O_1, \ldots, O_C$: positive integers satisfying $1 < O_S < N$ and $\gcd(O_S, N) = 1$
C, d: positive integers satisfying $$n < \binom{c}{d}$$

$O_1, \ldots, O_{\overline{C}}$: positive integers satisfying $1 < O_s < N$ and $\gcd(O_S, N) = 1$
$\overline{C}, \overline{d}$: positive integers satisfying $$2^{m-1} n < \binom{\overline{c}}{\overline{d}}$$

$usr_i$: a user in U where $1 \leq i \leq n$.
$\{\sigma_i(1), \ldots, \sigma_i(d)\}$: a set of integers for $usr_i$ where $\sigma_i$ is an 1-1 map from $\{1, \ldots, d\}$ to $\{1, \ldots, C\}$, $\sigma_i(s) < \sigma_i(s+1)$ and $\sigma_i$'s are distinct.
$usr_{ij}$: a user in U where $1 \leq i \leq L$, $1 \leq j \leq l$ and $Ll = n$.
$\{\sigma_{ij}(1), \ldots, \sigma_{ij}(d)\}$: a set of integer for $usr_{ij}$ where $\sigma_{ij}$ is an 1-1 map from $\{1, \ldots, d\}$ to $\{1, \ldots, C\}$, $\sigma_{ij}(s) < \sigma_{ij}(s+1)$ and $\sigma_{ij}$'s are distinct.

$usr_{ijk}$: a user in U where $1 \leq i \leq L$, $1 \leq j \leq 1$, $1 \leq k \leq m$ and $Llm = n$.

$$\{\sigma^I_{ijk}(1), \ldots, \sigma^I_{ijk}(\bar{d})\} \quad 5$$

where $k \in I \subset \{1, \ldots, m\}$: a set of integer for $usr_{ijk}$ where $\sigma^I_{ijk}$ is an 1-1 map from $\{1, \ldots, \bar{d}\}$ to $\{1, \ldots, \bar{C}\}$, $\{\sigma^I_{ijk}(s), \ldots, \sigma^I_{ijk}(s+1)\}$ and $\sigma^I_{ijk}$'s are distinct.

Ui: $\{usr_{ijk} \in U | 1 \leq j \leq 1, 1 \leq k \leq m\}$ $U_{ij}$: $\{usr_{ijk} \in U | 1 \leq k \leq m\}$ $K_i$: a secret key for $usr_i$ for $1 \leq i \leq n$ $y_1, \ldots, y_n$: distinct primes $K_p$: group key for $$P(K_p \equiv (\omega^d O)^{\nu \prod usr_i \in P} y_i \pmod{N})$$

In the conventional Fiat algorithm, $O^{y_i}$ is used as user secret information so that a variable O becomes known, but the method according to the basic exemplary embodiment of the present invention can make up for the drawbacks to the disclosure of the variable O since a different value $O_{\sigma_i}(1), \ldots, O_{\sigma_i}(d)$ is assigned as a base to each user.

Hereinafter, description will be made on a broadcast encryption process according to the basic exemplary embodiment. The broadcast encryption process has a setup step of server initialization and users' subscription, a group key calculation step of calculating a group key shared between a server and privileged users in order to decrypt a session key, and an encrypted message broadcast step of assigning the session key.

On the other hand, in the setup step being the first step of the process determines a user' storage amount, and the group key calculation step being the second step determines a transmission rate and a calculation amount. The encrypted message broadcast step being the third step encrypts the session key with the shared group key, and sends the encrypted session key.

As above, the basic exemplary embodiment of the present invention uses $O_{\sigma_i}(1), \ldots, O_{\sigma_i}(d)$ as a base of private secret information to be stored for calculations of a group key for each user. In here, the bases for all users are assigned a different value. On the other hand, if the bases for users are different from one another, the group key calculation step in Equation 4 as follows is needed to calculate a group key.

$$K_p = (\omega^d O)^{\nu \prod usr_i \in P} y_i \pmod{N} \quad \text{[Equation 4]}$$

In Equation 4, $\omega$ and $\nu$ are random numbers that a server generates at every transmission, and are values for preventing that plural collected group keys are used for collusion attacks. Further, $\omega$ and $\nu$ are values for preparing for attacks extracting secret information of a server by use of transmitted information $O_S$, together with secret information z of the server and transmitted information V.

First, the setup step as the first step is as below.

That is, a server generates N, yi, C, d, O, $O_S$, and $\sigma_i$ as initial setup values for all users i and s. Next, the server generates $K_i$ by using Equation 5 as follows to calculate a group key for each user.

$$K_i \equiv (O_{\sigma_{i(1)}} \ldots O_{\sigma_{i(d)}} O)^{z y_i} \pmod{N} \quad \text{[Equation 5]}$$

In Equation 5, it can be seen that $$O_{\sigma_{i(1)}} \ldots O_{\sigma_{i(d)}} O$$

is used, as above, as a base for the secret information $K_i$ for each user, where $$O_{\sigma_{i(1)}} \ldots O_{\sigma_{i(d)}}$$

is a base group generated by using combinations of one or more integers of plural different integers (that is, coprimes), and each user has a different combination method. The combination method is identified by $\sigma_i$ being an index of the above variable O. Further, the above variable O is one of the integers, and commonly included in the bases of all users. Therefore, each user calculates a group key value by eliminating the base group from the secret information through calculations to be later described.

For example, if combinations are made when d integers are selected from C integers, the $_CC_d$ combinations become possible. The number of combinations is preferably set higher than the number of users. Therefore, a base group produced by using a different combination can be allocated to each user.

Further, the exponent part of the secret information $K_i$ for each user becomes key value information $y_i$ allocated to each user. The key value information can be shared with all users, but the secret information $K_i$ is a value known only to corresponding users. On the other hand, the variable z included in the exponent part of the secret information is a server's own random value generated by the server and added for security of the secret information.

Further, N, $y_i$, and $\sigma_i$ are commonly provided to all users. The value of N is an RSA composite value of a considerably large number, and determines integer values of the variable O for the base in the range of the value N. The $y_i$ denotes key value information allocated to each user as aforementioned, and the $\sigma_i$ denotes information on combinations for producing the above base group.

Each user $usr_i$ stores N, $\{y_s | 1 \leq s \neq i \leq n\}$, and $\sigma_i$ that are commonly sent, including the value of $K_i$, from the server.

Therefore, the first step completely ends, and the second step is performed as below for group key calculations.

First, the server produces $\omega$ and $\nu$, and calculates and broadcasts V by using Equation 6 as follows.

$$V \equiv \nu z^{-1} \pmod{\phi(N)} \quad \text{[Equation 6]}$$

Next, the server calculates and broadcasts $\overline{O}_s$ for $1 \leq s \leq C$ by using Equation 7 as follows.

$$\overline{O}_s \equiv (\omega^{-1} O_s)^{-\nu \prod usr_i \in P} y_i \pmod{N} \quad \text{[Equation 7]}$$

In here, the $\overline{O}_s$ becomes an inverse-base parameter value for eliminating a base group of the received secret information in order for each user to derive a group key.

In Equation 7, the inverse-base parameter value has as a base each integer $O_s$ used to produce the base group, and has an exponent part of key value information for each user allocated to all privileged users P.

Further, ω and ν applied respectively to the base and exponent parts of the inverse-base parameter value are random numbers generated by the server, produced at every transmission in order for the inverse-base parameter value to be safely sent for security reasons, and used for the calculations of the inverse-base parameter value.

Further, the value ν is calculated together with the server's own random value z as stated in Equation 6, and sent separately to all users.

On the other hand, the each user $usr_i$ uses the values (that is, each user's key value $y_i$, combination information $σ_i$, information on privileged users P, secret information $K_i$, inverse-base parameter value $\overline{O}_s$, and the like) broadcast from the server to calculate a group key value $K_p$ by using Equation 8 as follows.

$$K_p = (\overline{O}_{σ_i(1)} \cdots \overline{O}_{σ_i(d)}) \times K_i^{ν \prod_{usr_s \in P-(i)} y_i} \pmod{N} \quad \text{[Equation 8]}$$

If the group key is calculated as in Equation 8, each user uses the calculated group key to decrypt a session key received from the server.

That is, the server derives the group key $K_p$ by using Equation 4, encrypts the session key by using the derived group key, and sends the encrypted session key to each user. Each user decrypts $E(K_p, k)$ received from the server by using the group key calculated in Equation 8 as stated above, and obtains the session key.

Table 1 as below shows performance analysis based on the method according to the basic exemplary embodiment of the present invention. In the performance analysis, an assumption is made that log N=1024, log k=128, log $y_j$=log $y'_j$=b, r=$2^{18}$, n=$2^{20}$.

TABLE 1

| Basic exemplary embodiment | Transmission rate (kbyte) | Storage amount (kbyte) | Calculation amount (bit) |
|---|---|---|---|
| b, C, d | logN + ClogN + logk | 2logN + (n − 1)log $y_i$ + 16d | logN + (n − 1)log $y_i$ |
| 25, 26, 10 | 3.39 | 3200.27 | 26, 215, 424 |

In Table 1, the basic exemplary embodiment of the present invention compensates for the collusion attack problem being the drawbacks of the conventional Fiat algorithm, accompanying a somewhat increased transmission rate. Therefore, five different exemplary embodiments of the present invention are disclosed as below to reduce transmission rate, storage amount, and calculation amount compared to the basic exemplary embodiment.

Hereinafter, the exemplary embodiments of the present invention will be each described with reference to the accompanying drawings.

First Exemplary Embodiment

The method according to the first exemplary embodiment of the present invention groups total users n (upper group) into L groups, allocates a large random number $x_i$ to each group, and allocates l(=n/L) primes to l users of each group, respectively, in order to compensate for the above basic exemplary embodiment and the Fiat algorithm basically requiring a lot of calculation and storage amounts. Each group uses the same prime, but is identified and kept secure by the secret information $x_i$ of a server. Thus, the calculation and storage amounts are remarkably reduced.

Prior to description on the first exemplary embodiment of the present invention, definitions are made as below on coefficients necessary for the description of the first exemplary embodiment and the second exemplary embodiment to be later described.

U set of users with |U|=n

P set of privileged users with |U−P|=r

N: RSA composite

ω, ν: random numbers z: a large integer k: a session key

O: a positive integer satisfying 1<O<N $O_i, \ldots, O_C$: positive integers satisfying $1<O_s<N$ and gcd($O_s$, N)=1.

C, d: positive integers satisfying $$n < \binom{c}{d}$$

$O_1, \ldots, O_{\overline{C}}$: positive integers satisfying $1<O_s<N$ and gcd($O_s$, N)=1.

$\overline{C}, \overline{d}$: positive integers satisfying $$2^{m-1} n < \binom{\overline{c}}{\overline{d}}$$

$usr_i$: a user in U where 1≤i≤n.

$\{σ_i(1), \ldots, σ_i(d)\}$: a set of integer for $usr_i$ where $σ_i$ is an 1-1 map from $\{1, \ldots, d\}$ to $\{1, \ldots, C\}$, $σ_i(s)<σ_i(s+1)$ and $σ_i$'s are distinct.

$usr_{ij}$: a user in U where 1≤i≤L, 1≤j≤l and Ll=n.

$\{σ_{ij}(1), \ldots, σ_{ij}(d)\}$: a set of integers for $usr_{ij}$ where $σ_{ij}(s) <σ_{ij}(s+1)$ and $σ_{ij}$'s are distinct.

$usr_{ijk}$: a user in U where 1≤i≤L, 1≤j≤l≤k≤m and Llm=n.

$$\{σ^I_{ijk}(1), \ldots, σ^I_{ijk}(\overline{d})\}$$

where k∈I ⊂ $\{1, \ldots, m\}$: A set of integer for $usr_{ijk}$ where $σ^I_{ijk}$ is an 1-1 map from $\{1, \ldots, \overline{d}\}$ to $\{1, \ldots, \overline{C}\}$, $σ^I_{ijk}(s)<σ^I_{ijk}(s+1)$ and $σ^I_{ijk}$'s are distinct.

$U_i$: $\{usr_{ijk} \in U | 1 \leq j < l, 1 \leq k \leq m\}$ $U_{ij}$: $\{usr_{ijk} \in U | 1 \leq k \leq m\}$ $K_{ij}$: a secret key for $usr_{ij}$ for 1≤i≤L, 1≤j≤l and Ll=n $x_i, \ldots, x_L$: large integers $y_i, \ldots, \overline{y}_1$: distinct primes $K_{p1}, \ldots, \overline{K}_{PL}$: subgroup keys for $$P(K_{pi} \equiv (ω^d O)^{νx_i} \prod_{usrij \in P} y_j \pmod{N})$$

Figure 2:
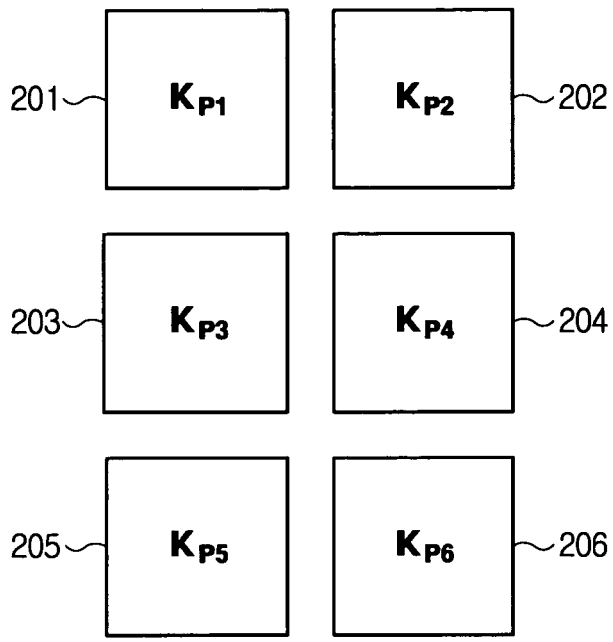
FIG. 2 is a view for conceptually showing grouping a user set into groups according to first and second exemplary embodiment of the present invention.

FIG. 2 is a view for conceptually showing grouping of a user set into groups according to the first and second exemplary embodiment of the present invention. In FIG. 2, the user set (upper group) is grouped into L groups. In FIG. 2, the user set is grouped into 6 groups P1(201) to P6(206).

In here, 1 users constituting each of the groups is assigned 1=n/L primes y1, ..., yl. That is, the basic exemplary embodiment of the present invention is applied to the L user sets each having the size of 1. By doing so, a different group key can be derived for each group. That is, six group keys can be derived at a maximum, and Equation 9 can be expressed for $1 \leq i \leq L$, as below.

$$K_{pi} \equiv (\omega^d O)^{vx_i \prod_{usr_{ij} \in P} y_j} \pmod{N} \quad \text{[Equation 9]}$$

In Equation 9, $x_i$ denotes a random number used to identify individual groups. However, the bases for individual n users have to be differently established as in the basic exemplary embodiment for security reasons.

Hereinafter, description will be made on a broadcast encryption process according to the first exemplary embodiment of the present invention. The broadcast encryption process according to the first exemplary embodiment is divided into a setup step of server initialization and user subscription, a sub-group key calculation step of calculating a sub-group key shared between a server and privileged users in order to decrypt a session key, and an encrypted message broadcast step of assigning the session key.

On the other hand, of the process, the setup step being the first step determines a user's storage amount, the sub-group key calculation step being the second step determines a transmission rate and a calculation amount. The encrypted message broadcast step being the third step encrypts a session key with the shared sub-group key and sends the encrypted session key.

In the setup step, the server produces N, $x_i$, $y_i$, C, d, $O_s$, and $\sigma_{ij}$ for all i, j, and s, as initialization values. Next, the server produces secret information $K_{ij}$ of each user of a corresponding group in order to calculate a group key for each user $usr_{ij}$, using Equation 10 as follows.

$$K_{ij} \equiv \left(O_{\sigma_{ij(1)}} \ldots O_{\sigma_{ij(d)}} O\right)^{zx_i y_j} \pmod{N} \quad \text{[Equation 10]}$$

Figure 10:
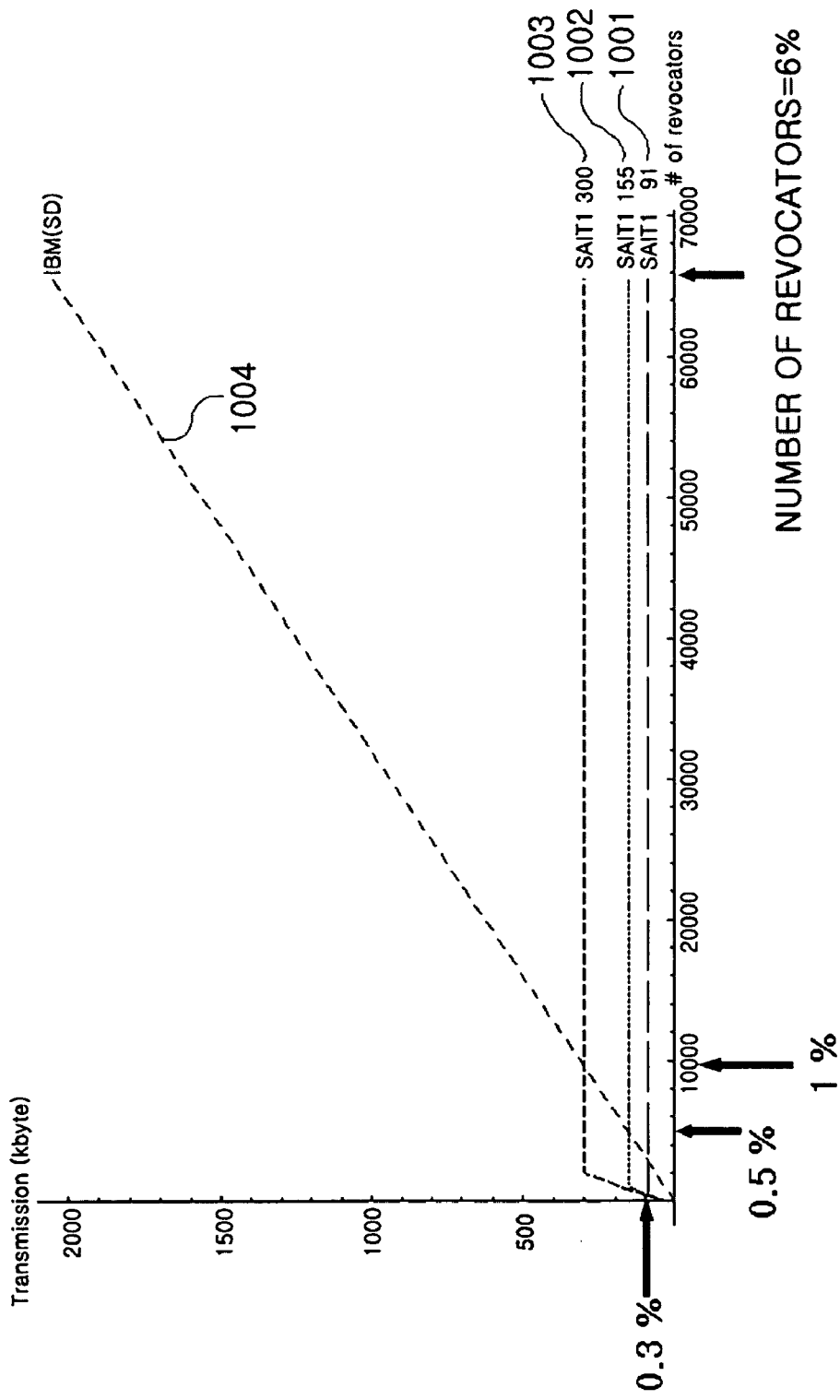
FIG. 10 is a graph for comparing the transmission overheads of the exemplary embodiments of the present invention to those of prior art.

In FIG. 10, it can be seen that $O_{\sigma_{ij}}(1), \ldots, O_{\sigma_{ij}}(d)O$ is used as a base for the secret information $K_{ij}$ of each user of a corresponding group as stated above. In here, as stated above, $O_{\sigma_{ij}}(1), \ldots, O_{\sigma_{ij}}(d)$ is a base group produced through combinations of more-than-one integers of plural different integers (that is, coprimes), and each user of a corresponding group has a different combination. The combination is identified by an index $\sigma_{ij}$ of O. Further, O is one of the integers, which is commonly included in the bases for all users. Thus, each user calculates a group key value by eliminating the base group from the secret information $K_{ij}$ by calculations to be later described.

On the other hand, the server sends the produced value $K_{ij}$ to individual users $usr_{ij}$ through security channels. Here, N, $y_i$, and $\sigma_{ij}$ for all i and j are provided.

Further, the individual users $usr_{ij}$ store N, $\{y_s | 1 \leq s \neq j \leq l\}$, and $\sigma_{ij}$, including the value $K_{ij}$ sent from the server.

The first exemplary embodiment uses values of integer combinations as bases of the secret information sent to the users of each group, as in the basic exemplary embodiment.

Thus, the first step completely ends, the second step is performed, as below, to calculate sub-group keys, that is, group keys for individual groups.

First, the server produces the $\omega$ and $v$, calculates and broadcasts V by using Equation 6.

Next, the server calculates and broadcasts $$\bar{O}_s^{-i}$$

for $1 \leq i \leq L$ and $1 \leq s \leq C$, using Equation 11 as below.

$$\bar{O}_s^{-i} \equiv (\omega^{-1} O_s)^{-vx_i \prod_{usr_{ij} \in P} y_j} \pmod{N} \quad \text{[Equation 11]}$$

In here, the $$\bar{O}_s^{-i}$$

becomes an inverse-base parameter value for eliminating a base group of the received secret information in order to derive a group key for each user.

In Equation 11, the inverse-base parameter value has each integer $O_s$ as a base used for producing the base group, and also has as exponent key value information of each user allocated to all privileged users P. In here, the first exemplary embodiment has the exponent part of the inverse-base parameter value containing a random value $x_i$ allocated to each group.

On the other hand, $\omega$ and $v$ calculated in the base and exponent parts of the inverse-base parameter value are random values produced by the server as stated above in the basic exemplary embodiment, which are produced at every transmission to send the inverse-base parameter value safely for security reasons and used in calculations of the inverse-base parameter value.

Likewise, the value $v$ is calculated together with a server's own random value z as stated in detail in Equation 6, and separately sent to all users.

On the other hand, each user $usr_{ij}$ calculates a sub-group key value $K_{pi}$ for each group i by using the values broadcast from the server and the stored values by using Equation 12.

$$K_{Pi} = \left(\bar{O}_{\sigma_{ij(1)}}^{-i} \ldots \bar{O}_{\sigma_{ij(d)}}^{-i}\right) \times K_{ij}^{V \prod_{usr_{is} \in P-(usr_{ij})} y_s} \pmod{N} \quad \text{[Equation 12]}$$

If the group key is calculated as shown in Equation 12, each user decrypts the session key received from the server by using the calculated group key, that is, a sub-group key for each group.

That is, the server derives the group key $K_{Pi}$ by use of Equation 9, encrypts a session key k with the derived group key, and sends $E(K_{Pi}, k)$ to each user. As stated above, each user decrypts $E(K_{Pi}, k)$ received from the server with the group key calculated in Equation 12, and obtains a session key.

Table 2 shows performance analysis based on the method according to the first exemplary embodiment of the present invention. In the performance analysis, an assumption will be made that $\log N = 1024$, $\log k = 128$, $\log y_i = \log y'_j = b$, $r = 2^{18}$, and $n = 2^{20}$.

TABLE 2

| First exemplary embodiment | Transmission rate (kbyte) | Storage amount (kbyte) | calculation amount (bit) |
|---|---|---|---|
| b, l, C, d | $\log N + C \log N + L \log k$ | $2 \log N + (l-1) \log y_i + 16d$ | $\log N + (l-1) \log y_i$ |
| 13, 512, 26, 10 | 6688.12 | 1.08 | 7,667 |
| 14, 1024, 26, 10 | 3344.12 | 2.02 | 15,356 |
| 15, 2048, 26, 10 | 1672.12 | 4.02 | 31,729 |

In Table 2, the first exemplary embodiment of the present invention groups individual users into L groups and derives a sub-group key for each group, so as to reduce the calculation and storage amounts.

Second Exemplary Embodiment

The method according to a second exemplary embodiment of the present invention separately calculates and sends the exponent and base parts of the inverse-base parameter value in order to reduce the increased transmission rate of the first exemplary embodiment. The base part is protected by the random numbers ω and ν, and the exponent part is protected by the server's secret information xi and the random number ω. By doing so, the transmission rate can be reduced.

Hereinafter, description will be made of a broadcast encryption process according to the second exemplary embodiment of the present invention. The broadcast encryption process according to the second exemplary embodiment is divided into a setup step of server initialization and user subscription, a sub-group key calculation step of calculating a sub-group key shared between a server and privileged users in order to decrypt a session key, and an encrypted message broadcast step of assigning the session key.

On the other hand, of the process, the setup step being the first step determines a user's storage amount, the sub-group key calculation step being the second step determines a transmission rate and a calculation amount. The encrypted message broadcast step being the third step encrypts a session key with the shared sub-group key and sends the encrypted session key.

First, the setup step as the first step is the same as in the first exemplary embodiment. Therefore, detailed description on the setup step will be omitted.

The first step completely ends, and the second step is performed, as below, to calculate sub-group keys.

First, the server produces the ω and ν, calculates and broadcasts V by using Equation 6.

Next, the server calculates and broadcasts the base part $O_s^{-i}$ of the inverse-base parameter value, using Equation 13 as follows.

$$\overline{O}_s \equiv (\omega O_s^{-1})^{v\omega^{-1}} (\mathrm{mod}\, N) \qquad \text{[Equation 13]}$$

Further, the server calculates and broadcasts the exponent part $e_i$ of the inverse-base parameter value for $1 \leq i \leq L$ by using Equation 14 as follows, according to the second exemplary embodiment of the present invention.

$$e_i \equiv \omega x_i \prod_{usr_{ij}^P} y_j (\mathrm{mod}\, \phi(N)) \qquad \text{[Equation 14]}$$

On the other hand, each user $usr_{ij}$ calculates a sub-group key value $K_{Pi}$ for each group i by using the values broadcast from the server and the stored values by using Equation 15 as below.

$$K_{Pi} = \left(\overline{O_{\sigma_{ij(1)}}} \ldots \overline{O_{\sigma_{ij(d)}}}\right)^{e_i} \times K_{ij}^v \prod_{usr_{is} \in P-\{usr_{ij}\}} y_s (\mathrm{mod}\, N) \qquad \text{[Equation 15]}$$

If the group key is calculated as shown in Equation 15, each user decrypts a session key received from the server by using the calculated group key.

That is, the server derives the group key $K_{Pi}$ by use of Equation 9, encrypts a session key k with the derived group key, and sends $E(K_{Pi}, k)$ to each user. As stated above, each user decrypts the $E(K_{Pi}, k)$ received from the server with the group key calculated in Equation 15, and obtains the session key.

Table 3 shows performance analysis based on the method according to the second exemplary embodiment of the present invention. In the performance analysis, an assumption will be made that log N=1024, log k=128, log $y_i$=log $y^I_j$=b, $r=2^{18}$, and $n=2^{20}$.

TABLE 3

| Second exemplary embodiment | Transmission rate (kbyte) | Storage amount (kbyte) | calculation amount (bit) |
|---|---|---|---|
| b, l, C, d | $\log N + C \log N + L \log N + L \log k$ | $2 \log N + (l-1) \log y_i + 16d$ | $2 \log N + (l-1) \log y_i$ |
| 13, 512, 26, 10 | 291.37 | 1.08 | 8,691 |
| 14, 1024, 26, 10 | 147.37 | 2.02 | 16,370 |
| 15, 2048, 26, 10 | 75.37 | 4.02 | 31,733 |

In Table 3, the second exemplary embodiment of the present invention separately calculates the exponent and base parts of transmission data so as to remarkably reduce the transmission rate.

So far, description has been made on the first and second exemplary embodiments of the present invention with reference to FIG. 2. Hereinafter, the third to fifth exemplary embodiments of the present invention will be described with reference to FIG. 3 to FIG. 6.

Third Exemplary Embodiment

The method according to the third exemplary embodiment of the present invention groups an 1-users' group obtained in the first exemplary embodiment into m-users' groups again in order to reduce the calculation amount more than the above exemplary embodiments. As in the first exemplary embodiment, each of the L groups has a group key, but the third exemplary embodiment to be later discussed allocates an allocated prime to every m users.

Further, all subsets to an m-users' set are assigned a prime in order that revocators can be dealt with in all possible circumstances, and a user additionally stores user's secret information in all possible circumstances. Therefore, there occurs an effect of reduction to one-mth of the calculation amount.

Prior to the description of the third exemplary embodiment of the present invention, definitions are made as below on coefficients necessary for the description of the third exemplary embodiment and the fourth and fifth exemplary embodiments to be later described.

U: set of users with |U|=n
P: set of privileged users with |U−P|=r
N: RSA composite
ω, ν: random numbers z: a large integer
k: a session key
O: a positive integer satisfying 1<O<N
$O_1, \ldots, O_C$: positive integers satisfying $1<O_s<N$ and $\gcd(O_s, N)=1$.
C, d: positive integers satisfying $$n < \binom{c}{d}$$

$\overline{O}_1, \ldots, \overline{O}_{\overline{C}}$: positive integers satisfying $1<\overline{O}_s<N$ and $\gcd(\overline{O}_s, N)=1$.
$\overline{C}, \overline{d}$: positive integers satisfying $$2^{m-1}n < \binom{\overline{c}}{\overline{d}}$$

$usr_i$: a user in U where $1 \leq i \leq n$.
$\{\sigma_i(1), \ldots, \sigma_i(d)\}$: a set of integer for $usr_i$ where $\sigma_i$ is an 1-1 map from $\{1, \ldots, d\}$ to $\{1, \ldots, C\}$, $\sigma_i(s)<\sigma_i(s+1)$ and $\sigma_i$'s are distinct.
$usr_{ij}$: a user in U where $1 \leq i \leq L$, $1 \leq j \leq l$ and $Ll=n$.
$\{\sigma_{ij}(1), \ldots, \sigma_{ij}(d)\}$: A set of integers for $usr_{ij}$ where $\sigma_{ij}$ is an 1-1 map from $\{1, \ldots, d\}$ to $\{1, \ldots, C\}$, $\sigma_{ij}(s)<\sigma_{ij}(s+1)$ and $\sigma_{ij}$'s are distinct.
$usr_{ijk}$: a user in U where $1 \leq i \leq L$, $1 \leq j \leq l$, $1 \leq k \leq m$ and $Llm=n$.

$$\{\sigma_{ijk}^I(1), \ldots, \sigma_{ijk}^I(\overline{d})\}$$

where $k \in I \subset \{1, \ldots, m\}$: a set of integer for $usr_{ijk}$ where $\sigma_{ijk}^I$ is an 1-1 map from $\{1, \ldots, \overline{d}\}$ to $\{1, \ldots, \overline{C}\}$, $\sigma_{ijk}^I(s)<\sigma_{ijk}^I(s+1)$ and $\sigma_{ijk}^I$'s are distinct.
$U_i$: $\{usr_{ijk} \in U | 1 \leq j \leq l, 1 \leq k \leq m\}$
$U_{ij}$: $\{usr_{ijk} \in U | 1 \leq k \leq m\}$
$K_{ij}^I$: where $I \subset \{1, \ldots, m\}$: A secret key for $usr_{ijk}$ for $1 \leq i \leq L$, $1 \leq j \leq l$ and $Llm=n$
$x_i, \ldots, x_L$: large integers
$y_j^I$: distinct primes for $1 \leq j \leq l$ and nonempty subset I of $\{1, \ldots, m\}$ (where $y^\Phi_j=1$)
$I_{ij}=\{k | usr_{ijk} \in P \cap U_{ij}\}$
$K_{P1}, \ldots, K_{PL}$: subgroup keys for $$P\left(K_{pi} \equiv (\omega^d O)^{vx_i} \prod_j y_j^{l_{ij}} \pmod{N}\right)$$

Figure 3:
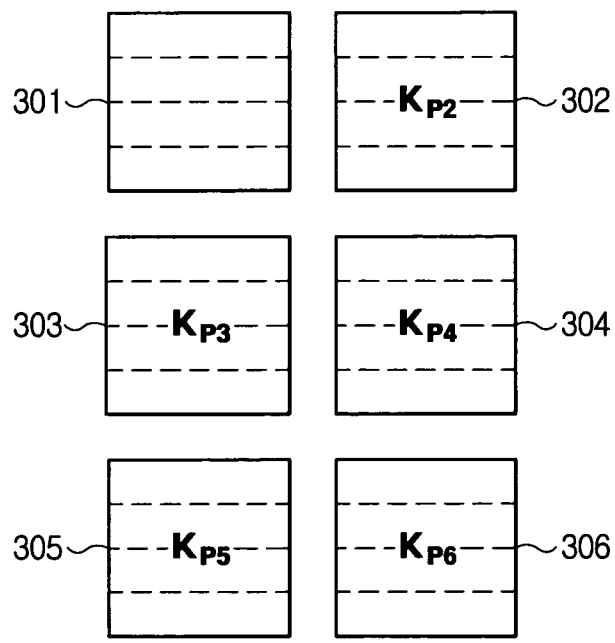
FIG. 3 is a view for conceptually showing re-grouping a user group into sub-groups according to third, fourth, and fifth exemplary embodiments of the present invention.

FIG. 3 is a view for conceptually showing re-grouping of a user group into sub-groups according to the third, fourth, and fifth exemplary embodiments of the present invention. In FIG. 3, the user set is grouped into L groups as in FIG. 2. In FIG. 3, the user set is grouped into 6 groups P1(301) to P6(306). Next, each group is re-grouped into plural sub-groups according to the third exemplary embodiment of the present invention. As stated above, the L groups each have a group key as in the first exemplary embodiment, but the third exemplary embodiment allocates each assigned prime to every m users.

Figure 4:
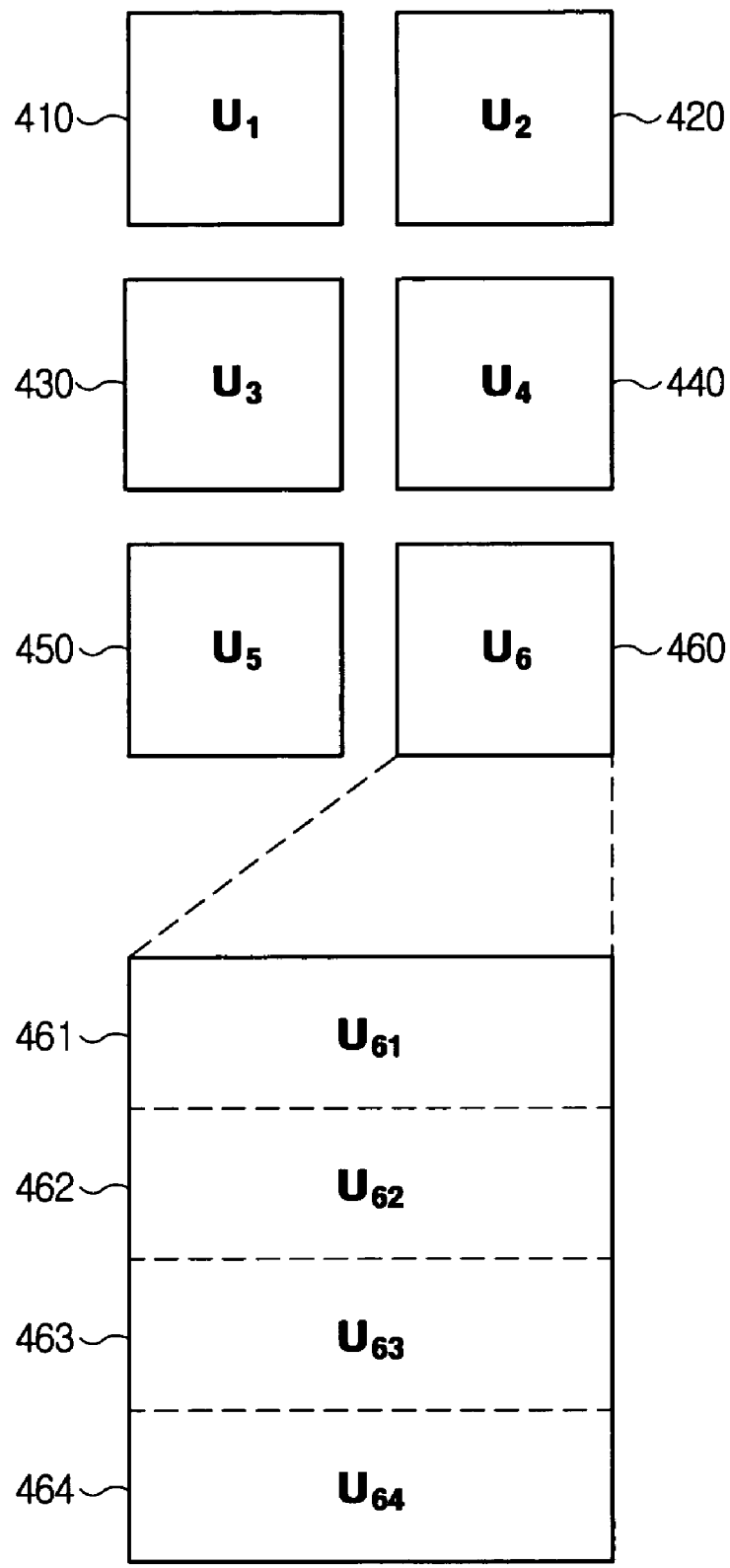
FIG. 4 is a view for showing a method of re-grouping a user group into sub-groups according to third, fourth, and fifth exemplary embodiments of the present invention.

FIG. 4 is a view for showing a method of re-grouping a user group into plural sub-groups according to the third exemplary embodiment of the present invention and the fourth and fifth exemplary embodiments of the present invention to be later described. In FIG. 4, users are divided into $U_1$ to $U_6$ 410 to 460, and each group is re-divided into plural sub-groups. For example, the group $U_6$ 460 is re-grouped into sub-groups $U_{61}$ 461, $U_{62}$ 462, $U_{63}$ 463, and $U_{64}$ 464.

Further, all subsets to an m-users' set are assigned a prime in order that revocators can be dealt with in all possible circumstances, and a user additionally stores user's secret information in all possible circumstances. On the other hand, the group key can be derived in Equation 16 as below according to the third exemplary embodiment of the present invention.

$$K_{Pi} = (\omega^d O)^{vx_i} \prod_j y_j^{l_{ij}} \pmod{N} \quad \text{[Equation 16]}$$

Hereinafter, description will be made on a broadcast encryption process according to the third exemplary embodiment of the present invention. The broadcast encryption process according to the third exemplary embodiment is divided into a setup step of server initialization and user subscription, a sub-group key calculation step of calculating a sub-group key shared between a server and privileged users in order to decrypt a session key, and an encrypted message broadcast step of assigning the session key.

On the other hand, of the process, the setup step being the first step determines a user's storage amount, the sub-group key calculation step being the second step determines a transmission rate and a calculation amount. The encrypted message broadcast step being the third step encrypts a session key with the shared sub-group key and sends the encrypted session key.

In the setup step, the server produces N, $x_i$, $y_j^I$, $\overline{C}$, $\overline{d}$, O, $O_s$, and $\sigma_{ijk}^I$ for all i, j, k, I and s, as initialization values. Next, the server produces secret information $K_{ijk}^I$ of each user $usr_{ijk}$ for all I including k and all of i, j, and k, in order to calculate a sub-group key, using Equation 17.

$$K_{ijk}^I \equiv \left(O_{\sigma_{ijk}^I(1)} \ldots O_{\sigma_{ijk}^I(\overline{d})} O\right)^{zx_i y_j^I} \pmod{N} \quad \text{[Equation 17]}$$

The server sends the produced user's secret information value $K_{ijk}^I$ to individual users $usr_{ijk}$ through security channels. In here, N, $y_j^I$, and $\sigma_{ijk}^I$ for all i, j, and k are provided.

Further, the individual users $usr_{ijk}$ store N, $\{y_s^I, l 1 \leq s \neq j < 1,$ all I$\}$, and $\sigma_{ijk}^I$ for all I including the value k, including a $\{K_{ijk}^I | $all I including k$\}$ value sent from the server.

Thus, the first step completely ends, the second step is performed, as below, to calculate sub-group keys.

First, the server produces the $\omega$ and $v$, and calculates and broadcasts V by Equation 6.

Next, the server calculates and broadcasts the base part $\overline{O}_s$ of the inverse-base parameter value for $1 \leq s \leq \overline{C}$, using Equation 18 as below.

$$\overline{O} \equiv (\omega O_s^{-1})^{v\omega^{-1}} \pmod{N} \quad \text{[Equation 18]}$$

Further, the exponent part $e_i$ of the inverse-base parameter value is calculated and broadcast for $1 \leq i \leq L$ by using Equation 19 according to the third exemplary embodiment of the present invention.

$$e_i \equiv \omega x_i \prod_j y_j^{l_{ij}} \pmod{\phi(N)} \qquad \text{[Equation 19]}$$

On the other hand, each user $usr_{ijk}$ calculates a sub-group key value $K_{Pi}$ of each sub-group by using Equation 20 as below, using the values broadcast from the server and the stored values.

$$K_{Pi} = \left( \overline{O}_{\sigma_{ijk}^{l_{ij}}}(1) \ \cdots \ \overline{O}_{\sigma_{ijk}^{l_{ij}}}(\overline{d}) \right)^{e_i} \times \left( K_{ijk}^{l_{ij}} \right)^V \prod_{s \neq j} y_s^{l_{is}} \pmod{N} \qquad \text{[Equation 20]}$$

If a group key is calculated in Equation 20, each user decrypts a session key received from the server by using the calculated group key, that is, the sub-group key for each group.

That is, the server derives a group key $K_{Pi}$ by using Equation 16, and encrypts the session key k with the derived group key and sends $E(K_{Pi}, k)$ to each user. In here, each user decrypts the E(KPi, k) received from the server by using the group key calculated by using Equation 20 and obtains the session key, as above.

Table 4 shows performance analysis based on the method according to the third exemplary embodiment of the present invention. In the performance analysis, an assumption will be made that log N=1024, log k=128, log $y_i$=log $y^I_j$=b, r=$2^{18}$, and n=$2^{20}$.

TABLE 4

| Third exemplary embodiment | Transmission rate (kbyte) | Storage amount (kbyte) | Calculation amount (bit) |
|---|---|---|---|
| b, l, m, $\overline{C}$, $\overline{d}$ | log N + C log N + L log N + L log k | ($2^{m-1}$ + 1)log N + ($2^{m-1}$ − 1)(l − 1) log $y^I_j$ + $2^{m-1}$ 16d | 2 log N + (l − 1) log $y^I_i$ |
| 13, 256, 2, 26, 12 | 291.37 | 1.63 | 5,363 |
| 15, 128, 4, 28, 12 | 291.62 | 4.80 | 3,953 |
| 14, 512, 2, 26, 12 | 147.37 | 3.04 | 9,202 |
| 16, 256, 4, 28, 12 | 147.62 | 8.78 | 6,128 |
| 16, 1024, 2, 26, 12 | 75.37 | 6.42 | 18,416 |
| 17, 512, 4, 28, 12 | 75.62 | 17.22 | 10,735 |

In Table 4, the third exemplary embodiment of the present invention can reduce the number of primes used as power of exponent by users in order to reduce the calculation amounts of the above exemplary embodiments. That is, as stated above, each of L groups is re-grouped into m-users groups. Therefore, n m-users groups become an n/L-users' group, and there exist L groups as such groups as above, accordingly. As a result, maximum (n/L)/m−1 primes can be used instead of maximum n/L−1 primes as a power of exponent in the second exemplary embodiment. To do this, there has to be primes corresponding to all subsets rather than a null set of m-users' groups, so that the calculation amount as above can be remarkably reduced. That is, when m has a value ranging from 2 to 6, the calculation amount can be remarkably reduced. Further, since the number of primes only increases, any problem for security does not occur.

Fourth Exemplary Embodiment

The fourth exemplary embodiment of the present invention can reduce the transmission amount further by enabling a corresponding group to share information that a server produces and users share, if there is no revocators from specific groups of the L groups in the third exemplary embodiment.

Therefore, a sub-group key value can be defined as in Equation 21 in the fourth exemplary embodiment and the fifth exemplary embodiment, which will be later discussed, of the present invention.

$$K_{Pi} \equiv \begin{pmatrix} (\omega^d O)^{v x_i \prod_j y_j^{l_{ij}}} \pmod{N} & \text{if } U_i \not\subset P \\ \text{is generated by the server} & \text{otherwise} \end{pmatrix} \qquad \text{[Equation 21]}$$

Hereinafter, description will be made on a broadcast encryption process according to the fourth exemplary embodiment of the present invention. The broadcast encryption process according to the fourth exemplary embodiment is divided, like the basic exemplary embodiment, into a setup step of server initialization and user subscription, a sub-group key calculation step of calculating a sub-group key shared between a server and privileged users in order to decrypt a session key, and an encrypted message broadcast step of assigning the session key.

In the setup step, the server produces N, $x_i$, $y^I_i$, $\overline{c}$, $\overline{d}$, O, $O_s$, and $\sigma^I_{ijk}$ for all i, j, k and s, as initialization values as in the third exemplary embodiment. Next, the server produces secret information $K^I_{ijk}$ of each user $usr_{ijk}$ for all I including k and all of i, j, and k, in order to calculate a sub-group key, using Equation 17.

Further, in the fourth exemplary embodiment of the present invention, the server additionally produces information $K_{U_i}$ produced by the server and shared by users for all i.

The server sends the produced values $K^I_{ijk}$ and $K_{U_i}$ to individual users $usr_{ijk}$ for all I including k through security channels. Here, N, $y^I_j$, and $\sigma^I_{ijk}$ for all i, j, I, and k are provided.

Further, the individual users $usr_{ijk}$ store $K_{U_i}$, N, $\{y^I_s | 1 \leq s \neq j \leq 1, \text{all I})\}$, and $\sigma^I_{ijk}$ for all I including the value k, including a value $\{K^I_{ijk} | \text{all I including k}\}$ sent from the server.

Thus, the first step completely ends, the second step is performed, as below, to calculate a sub-group key.

First, the server produces the ω and v, and calculates and broadcasts V by using Equation 6.

Next, the server calculates and broadcasts the base part $\overline{O}_s$ of the inverse-base parameter value for $1 \leq s \leq \overline{C}$, using Equation 18 described in the third exemplary embodiment.

Next, if $U_i$ does not belong to P for $1 \leq i \leq L$, that is, there exist revocators in a specific group, according to the fourth exemplary embodiment of the present invention, the exponent part $e_i$ is calculated and broadcast for $1 \leq i \leq L$ by Equation 19 of the third exemplary embodiment of the present invention.

Thus, each user $usr_{ijk}$ of a group received with $e_i$ since $U_i$ does not belong to P calculates a sub-group key value $K_{Pi}$ of each sub-group by using Equation 20, using the values broadcast from the server and the stored values. On the other hand, if there does not exist revocators in a specific group of the L groups, the value $K_{U_i}$ is used which is produced in the first step and shared with users.

Figure 5:
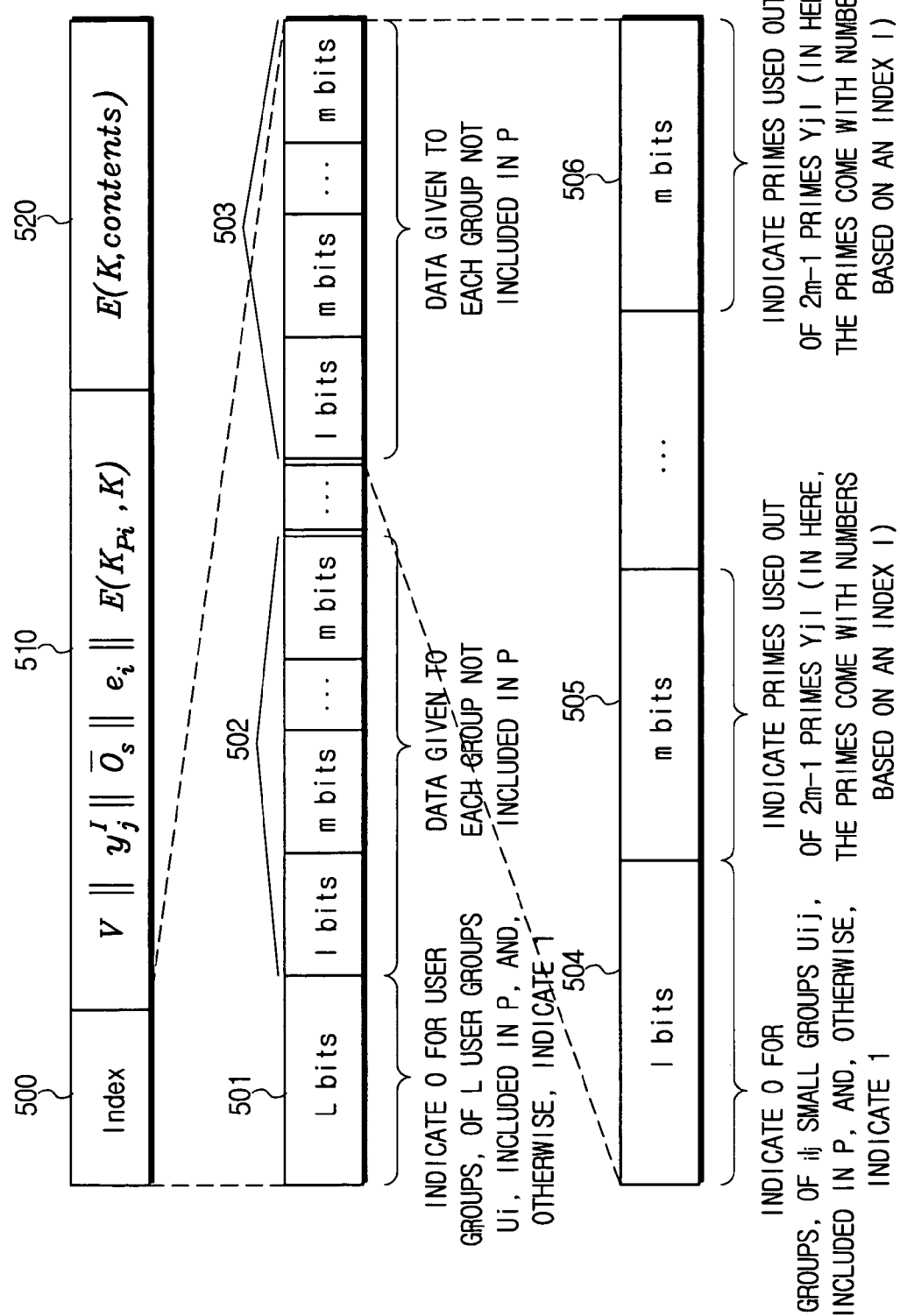
FIG. 5 is a view for showing a message format sent to each group according to the fourth exemplary embodiment of the present invention.

FIG. 5 is a view for showing a message format sent to each group according to the fourth exemplary embodiment of the present invention. In FIG. 5, a message sent to each user contains an index 500, the sub-group key value 510, and content information 520 encrypted by the key value. In here, the index 500 contains an L-bit revocator information field 510 containing information of whether there exist revocators by group and data fields 502 and 503 given to each group not included in P. Further, the data fields 502 and 503 given to each group not included in P can have a 1-bit field 504 denoting whether to belong to P out of one small user group $U_{ij}$ and m-bit fields 505 and 506 denoting primes used out of $2^{m-1}$ primes $y_i^j$.

In here, the 1-bit field 504 denoting whether to belong to P out of one small user group $U_{ij}$ is 0 therein if belonging to P out of one small user group $U_{ij}$. Otherwise, the 1-bit field 504 is 1. Further, the fields denoting used primes have numbers to the primes based on an index i.

Table 5 shows performance analysis based on the method according to the fourth exemplary embodiment of the present invention. In the performance analysis, an assumption will be made that log N=1024, log k=128, log $y_i$=log $y_j^I$=b, $r=2^{18}$, and $n=2^{20}$.

TABLE 5

| Fourth exemplary embodiment | Transmission rate (kbyte) | Storage amount (kbyte) | Calculation amount (bit) |
|---|---|---|---|
| b, l, m, $\overline{C}$, $\overline{d}$ | log N + C log N + min(L, r)log N + L log k | $(2^{m-1} + 2)$log N + $(2^{m-1} - 1)(l - 1)$ log $y_i^I$ + $2^{m-1}$ 16d | 2 log N + (l - 1) log $y^I$ |
| 13, 256, 2, 26, 12 | 291.37(35.37) | 1.76 | 5,363 |
| 15, 128, 4, 28, 12 | 291.37(35.62) | 4.93 | 3,953 |
| 14, 512, 2, 26, 12 | 147.37(19.37) | 3.17 | 9,202 |
| 16, 256, 4, 28, 12 | 147.62(19.62) | 8.91 | 6,128 |
| 16, 1024, 2, 26, 12 | 75.37(11.37) | 6.54 | 18,416 |
| 17, 512, 4, 28, 12 | 75.62(11.62) | 17.34 | 10,735 |

In Table 5, in the third exemplary embodiment, the transmission rate remains the same even when revocators are decreased, but, in the fourth exemplary embodiment, the transmission rate decreases when r<L at the maximum value thereof. The values in parentheses in the transmission rates of Table 5 become values when r approaches at 0.

Fifth Exemplary Embodiment

In the third and fourth exemplary embodiments, users can store the prime $y_j^I$ used for exponent computations as above, but the transmission rate does not increase greatly even though sent every time since the transmission rate is small. On the contrary, since the storage amount can be reduced, the fifth exemplary embodiment of the present invention proposes a method modified in a format of sending the prime $y_j^I$ every time.

Figure 6:
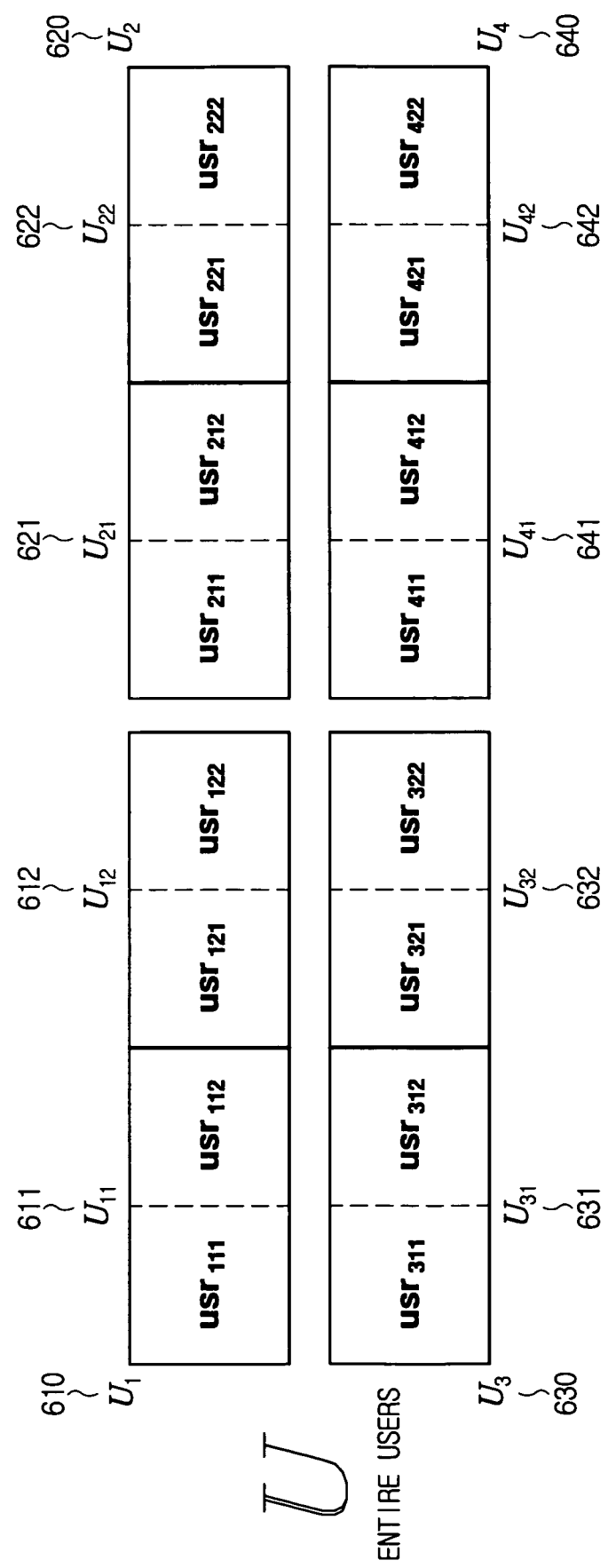
FIG. 6 is a view for showing assignment of users to groups according to the fifth exemplary embodiments of the present invention.

FIG. 6 is a view for showing grouping of individual users according to the fifth exemplary embodiment of the present invention. In FIG. 6, the whole users (that is, upper group) can be grouped into groups $U_1$ to $U_4$ (610 to 640), and each group is grouped again into sub-groups. For example, the group $U_1$ (610) is re-grouped into sub-groups $U_{11}$ (611) and $U_{12}$ (612). In here, $U_{11}$ (611) includes $usr_{111}$ and $usr_{112}$.

Hereinafter, description will be made on a broadcast encryption process according to the fifth exemplary embodiment of the present invention. The broadcast encryption process according to the fourth exemplary embodiment is divided, like the basic exemplary embodiment, into a setup step of server initialization and user subscription, a sub-group key calculation step of calculating a sub-group key shared between a server and privileged users in order to decrypt a session key, and an encrypted message broadcast step of assigning the session key.

In the setup step, the server produces N, $x_i$, $y_j^I$, $\overline{C}$, $\overline{d}$, O, $O_s$, and $\sigma_{ijk}^I$ for all i, j, k and s, as initialization values as in the fourth exemplary embodiment. Next, the server produces secret information $K_{ijk}^I$ of each user $usr_{ijk}$ for all I including k and for all of i, j, and k, in order to calculate a sub-group key of each user $usr_{ijk}$, using Equation 17.

The server sends the produced values $K_{ijk}^I$ to individual users $usr_{ijk}$ for all I including k through security channels. In here, N and $\sigma_{ijk}^I$ for all i, j, I, and k are provided.

Further, the individual users $usr_{ijk}$ store $\sigma_{ijk}^I$ for all I including N and k, including a value $\{K_{ijk}^I |$all I including k$\}$ sent from the server.

Thus, the first step completely ends, and the second step is performed, as below, to calculate a sub-group key.

First, the server produces the $\omega$ and $v$, and calculates and broadcasts V by using Equation 6.

Next, the server calculates and broadcasts the base part $\overline{O}_s$ of the inverse-base parameter value for $1 \leq s \leq \overline{C}$, using Equation 18 described in the third exemplary embodiment.

The server broadcasts $y_j^I$ for all subsets I of $1 \leq j \leq l$ and $\{1, \ldots, m\}$ according to the fifth exemplary embodiment of the present invention.

If the sub-group key is calculated in the second step as above, the server encrypts the broadcast message by the sub-group key and sends the encrypted message to each user in the third step as in the above exemplary embodiments, and each user who receives the message decrypts the received message by the calculated group key.

That is, the server produces, encrypts a message k for each group by using the sub-group key $K_{Pi}$, and sends $E(K_{Pi}, k)$ to each user. Each user decrypts the received $E(KPi, k)$ by the calculated sub-group key value.

The performance analysis according to the fifth exemplary embodiment of the present invention is as below. An assumption will be made that log N=1024, log k=128, log $y_i$=log $y_j^I$=b, $r=2^8$, and $n=2^{20}$.

TABLE 6

| Fifth exemplary embodiment | Transmission rate (kbyte) | Storage amount (kbyte) | Calculation amount (bit) |
|---|---|---|---|
| b, l, m, $\overline{C}$, $\overline{d}$ | log N + C log N + min(L, r)log N + L log k | $(2^{m-1} + 2)$log N + $(2^{m-1} - 1)(l - 1)$ log $y_i^I$ + $2^{m-1}$ 16d | 2 log N + (l - 1) log $y_i^I$ |
| 13, 256, 2, 26, 12 | 292.59(36.59) | 0.55 | 5,363 |
| 15, 128, 4, 28, 12 | 295.14(39.14) | 1.44 | 3,953 |
| 16, 86, 6, 30, 14 | 300.20(46.20) | 5.13 | 3,408 |
| 14, 512, 2, 26, 14 | 150.00(22.00) | 0.55 | 9,202 |
| 16, 256, 4, 28, 12 | 155.12(27.12) | 1.44 | 6,128 |
| 18, 171, 6, 30, 14 | 171.26(43.51) | 5.13 | 5,108 |
| 16, 1024, 2, 26, 12 | 81.37(17.37) | 0.55 | 18,416 |
| 17, 512, 4, 28, 12 | 91.56(27.56) | 1.44 | 10,735 |
| 19, 342, 6, 30, 14 | 125.70(61.83) | 5.13 | 8,527 |

In Table 6, the fifth exemplary embodiment of the present invention can reduce the storage amount by sending the prime $Y_i^I$ every time instead of storing the prime $Y_i^I$ that is used for the exponent calculation in the third and fourth exemplary embodiments.

Hereinafter, description will be made, with reference to FIG. 7 to FIG. 9, on a message transmission process according to the basic and first to fifth exemplary embodiments of the present invention.

Figure 7:
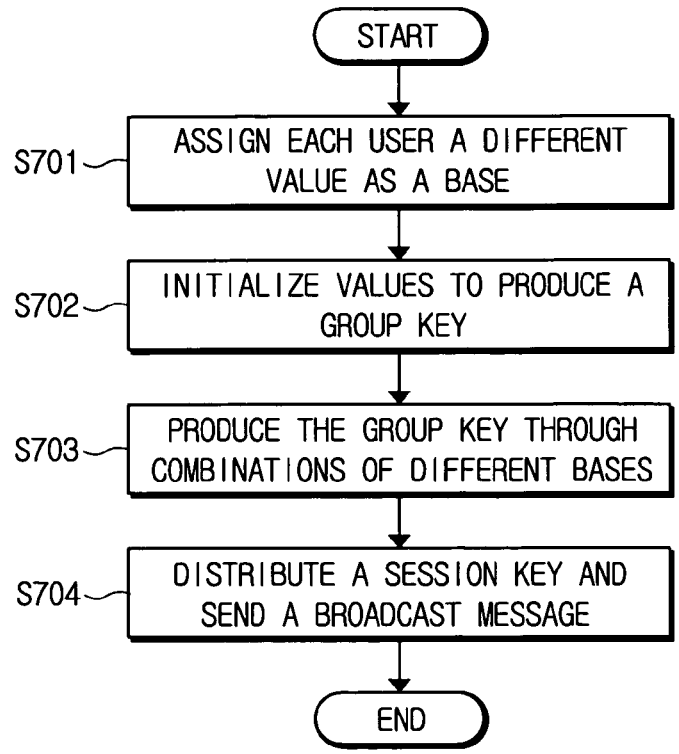
FIG. 7 is a flow chart for showing a process for assigning each user a key according to an exemplary embodiment of the present invention.

FIG. 7 is a flow chart for showing a process for assigning a key for each user according to the basic exemplary embodiment of the present invention. In FIG. 7, each user is assigned a different value as a base according to the basic exemplary embodiment of the present invention (S701). As stated above, the base is produced through combinations and assigned. Next, values are initialized to derive a group key (S702), and the group key is derived through combinations of different bases (S703). Lastly, a session key is assigned, and a broadcast message is sent (S704), so that the broadcast message transmission process ends.

Figure 8:
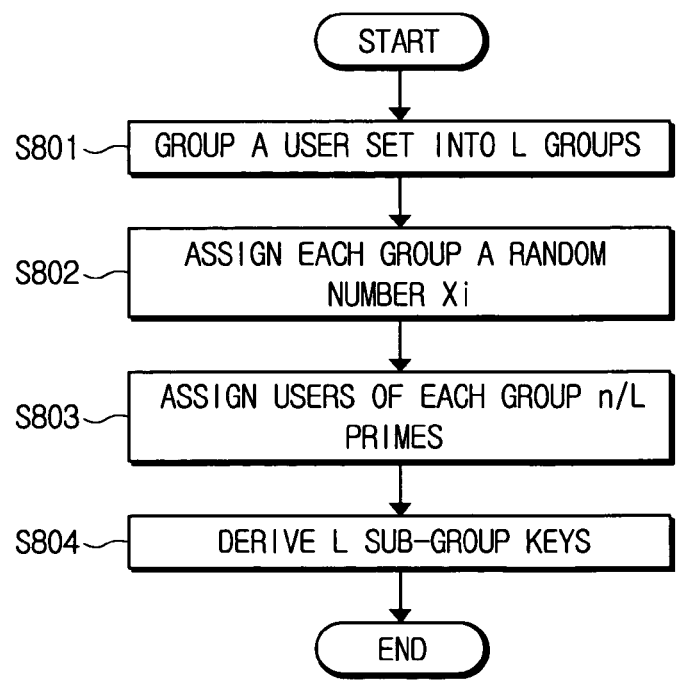
FIG. 8 is a flow chart for showing a process for assigning each user a key according to the first and second exemplary embodiments of the present invention.

FIG. 8 is a flow chart for showing a process for assigning a key for each user according to the first and second exemplary embodiments of the present invention. In FIG. 8, each user set is grouped into L groups according to the first and second exemplary embodiments of the present invention (S801). Next, each group is assigned a random number $X_t$ (S802). Next, n/L primes are allocated to users of each group (S803), and L sub-group keys are derived (S804).

Figure 9:
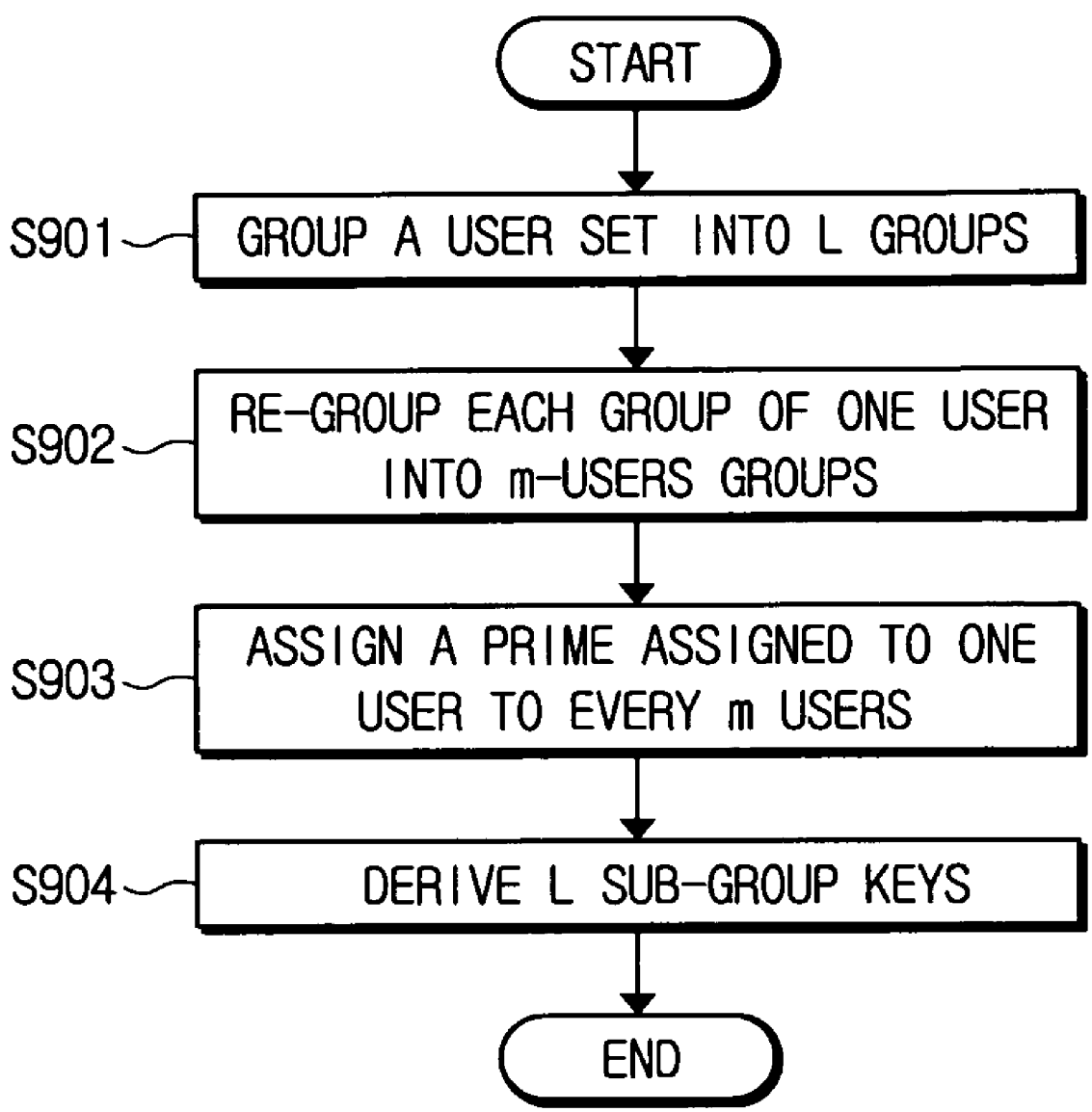
FIG. 9 is a flow chart for showing a process for assigning each user a key according to the third, fourth, and fifth exemplary embodiments of the present invention.

FIG. 9 is a flow chart for showing a process for assigning a key for each user according to the third, fourth, and fifth exemplary embodiments of the present invention. In FIG. 9, each user set is grouped into L groups according to the third to fifth exemplary embodiments of the present invention (S901). Next, each group of one user is grouped again into groups of m users (S902). The primes allocated to individual users are assigned to every group of m users (S903), and L sub-group keys are derived (S904).

Hereinafter, the present exemplary embodiments and prior art are compared in terms of performance by using graphs with reference to FIG. 10 and FIG. 11.

FIG. 10 is a graph for comparing transmission overheads of the present exemplary embodiment to those of prior art. In FIG. 10, it can be seen that the methods 1001, 1002, and 1003 of the present exemplary embodiments remarkably decreases the transmission overheads compared to prior art, for example, IBM's SD algorithm 1004, as the number of revocators increases.

Figure 11:
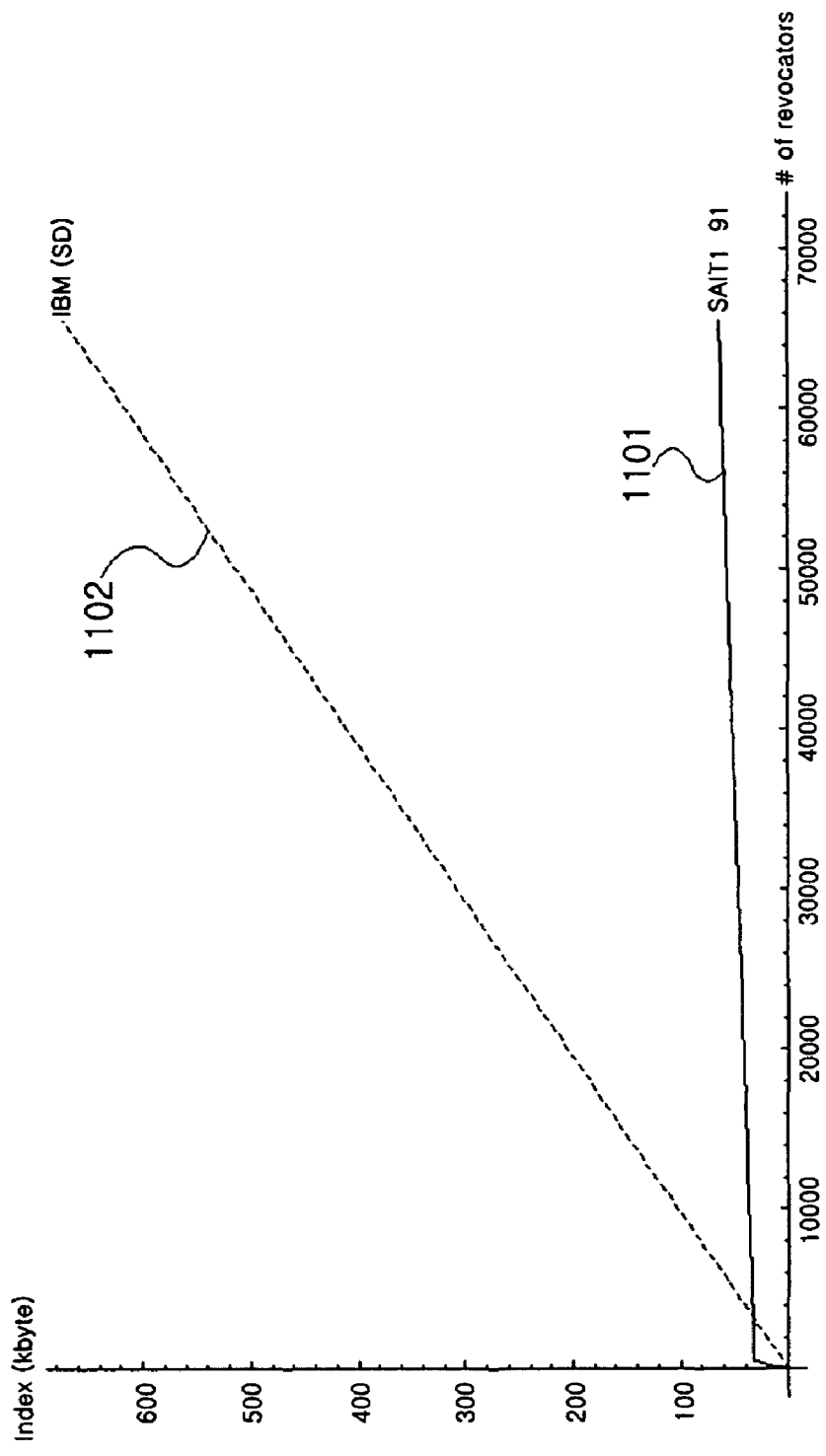
FIG. 11 is a graph for comparing the index overheads of the exemplary embodiments of the present invention to those of prior art.

FIG. 11 is a graph for comparing the index overheads of the present exemplary embodiments to those of prior art. In FIG. 11, it can be seen that the method 1101 according to the exemplary embodiment of the present invention remarkably decreases the index overheads compared to prior art, for example, IBM's SD algorithm 1102, as the number of revocators increases.

As aforementioned, in order to overcome the disclosure of the conventional broadcast encryption method to collusion attacks, the present invention assigns each user a base of a different combination, thereby having an advantage of security. Further, the diverse exemplary embodiments of the present invention can remarkably reduce the storage amount, transmission rate, calculation amount, and so on, necessary for broadcast encryptions.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A broadcast encryption method comprising:
   generating, by a server, a base group of unique base values, each of the base values generated from a unique combination of integers among a plurality of different integers having values greater than 1, and assigning a first base value among the unique base values to a first user and a second base value among the unique base values to a second user;
   generating first secret information and second secret information for the first user and the second user through calculations with key value information allocated to a corresponding user by using the first base value and the second base value as a base, respectively, and sending the secret information to the first user and the second user;
   generating an inverse-base parameter value through calculations with an integer used to produce the base group and key value information of the first user and the second user, and sending the produced inverse-base parameter value and key value information to the first user and the second user; and
   deriving a first group key and a second group key based on the key value information and the first secret information and the second secret information, respectively, encrypting a session key with the derived first group key and second group key and sending the encrypted session key encrypted with the derived first group key and the encrypted session key encrypted with the derived second group key to the first user and the second user, respectively.

2. The method as claimed in claim 1, wherein the integers are coprimes.

3. The method as claimed in claim 1, wherein the inverse-base parameter value is generated with a random number.

4. The method as claimed in claim 3, wherein the random number is used for the deriving the first group key.

5. The method as claimed in claim 3, wherein the at least one random number is sent to the first user and the second user.

6. The method as claimed in claim 1, wherein the first secret information is generated with a first random value and the second secret information is generated with a second random value.

7. The method as claimed in claim 1, wherein the base of the first secret information for the first user contains the first base value and a common integer commonly used for the first user and the second user, and the first group key is derived to have the base of the common integer.

8. The method as claimed in claim 1, further comprising sending, to each user, information for generating a corresponding base value.

9. The method as claimed in claim 1, further comprising sending information of a key value allocated to a user every time a broadcast message is sent.

10. A broadcast encryption method comprising:
    grouping, by a server, into a first group of users and a second group of users that receive a broadcast message, and assigning a first key value to a first user of the first group and a first user of the second group and second key value to a second user of the first group and a second user of the second group;
    generating a base group of unique base values for the first group and the second group, each of the base values generated from a unique combination of integers among a plurality of different integers having values greater than 1, and assigning a first base value among the unique base values to the first user of the first group and the first user of the second group and a second base value among the unique base values to the second user of the second group;
    generating first secret information for the first user of the first group and the first user of the second group and second secret information for the second user of the first group and the first user of the second group through calculations with key value information allocated to a corresponding user by using the first base value and the second base value as a base, and sending the secret information to the first user of the first group, the first user of the second group, the second user of the first group, and the second user of the second group;
    generating a first inverse-base parameter value through calculations with a first integer used to produce the first base group, a second inverse-base parameter value through calculations with a second integer used to produce the second base group, first key value information of the first user of the first group and the first user of the second group, and second key value information of the second user of the first group and the second user of the second group, sending the first inverse-base parameter value and the first key information to the first user of the first group and the first user of the second group, and sending the second inverse-base parameter value and the second key value information to the second user of the first group and the second user of the second group; and deriving a first group key based on the first key value information and the first secret information and the second group key based on the second key value information and the second secret information, encrypting a first session key with the first group key and a second session key with the second group key, sending the first session key to the first user of the first group and the first user of the second group, and sending the second session key to the second user of the first group and the second user of the second group.

11. The method as claimed in claim 10, wherein a first random number is assigned to the first group and a second random number is assigned to the second group, and the first random number is used in calculating the first secret information and the second random number is used in calculating the second secret information.

12. The method as claimed in claim 11, wherein the first random number is used in generating the first inverse-base parameter value and the second random number is used in generating the second inverse-base parameter value.

13. The method as claimed in claim 11, wherein the first group key is generated with the first random number and the second group key is generated with the second random number.

14. The method as claimed in claim 10, wherein integers are coprimes.

15. The method as claimed in claim 10, wherein the first inverse-base parameter value is generated with a first random number and the second inverse-base parameter value is generated with a second random number.

16. The method as claimed in claim 15, wherein the first random number is used for the deriving the first group key and the second random number is used for deriving the second group key.

17. The method as claimed in claim 15, wherein the first random number and server random number are sent to the first user of the first group and the first user of the second group and the second random number and the server random number are sent to the second user of the first group and the second user of the second group.

18. The method as claimed in claim 10, wherein the server produces a server random number which is used for the generating the first secret information and the second secret information.

19. The method as claimed in claim 10, wherein the base of the first secret information contains a base first group value and a common integer commonly used for the first user of the first group and the second user of the first group, and the first group key is derived based on the common integer.

20. The method as claimed in claim 10, wherein the server sends, to each user, the information for producing a corresponding base value.

21. The method as claimed in claim 10, wherein the server separately calculates an exponent part and a base part in the generating the first and second inverse-base parameter value, and separately sends the exponent part and base part of the first and second inverse-base parameter value.

22. The method as claimed in claim 10, wherein each group of users is grouped to a plurality of sub-groups, a key value is assigned to users of each sub-group, and secret information for each user is generated through calculations with key value information assigned to users of each sub-group.

23. The method as claimed in claim 10, wherein, if there are no unauthorized users in the first group, a separate key value assigned to the first group is established as the group key for the first group.

24. The method as claimed in claim 10, wherein the server sends the key value information assigned to the users every time the server sends the broadcast message.

25. A broadcast encryption method comprising:
receiving by a first user first secret information generated for the first user through calculations with first key value information allocated to the first user and receiving by a second user second secret information generated for the second user through calculations with second key value information allocated to the second user;
receiving by the first user an inverse-base parameter value and the first key value information, and receiving by the second user the inverse-base parameter value and the second key value information;
generating a first group key and a second group key by using the first secret information and second secret information, respectively; and
decrypting, by a processor of the first user and the second user, a session key received from the server by using the first group key and the second group key, respectively,
wherein the first secret information and the second secret information are generated from a base group of unique base values, each of the base values of the base group generated from a unique combination of integers among a plurality of different integers having values greater than 1, that includes a first base value assigned to the first user and a second base value assigned to the second user, and
wherein the inverse-base parameter value is generated through calculations with integers used to generate the base group and the key value information of the first user and the second user.

26. The method as claimed in claim 25, wherein the integers are coprimes.

27. The method as claimed in claim 26, wherein the inverse-base parameter value is calculated with a random number.

28. The method as claimed in claim 27, wherein the random number is used for the deriving the first group key.

29. The method as claimed in claim 25, wherein a server produces the random number.

30. The method as claimed in claim 29, wherein the random number is received from the server.

31. The method as claimed in claim 25, wherein the base of the first secret information for the first user contains the first base value and a common integer commonly used for the first user and the second user, and the first group key is derived by using the common integer as a base.

32. The method as claimed in claim 25, wherein each user receives, from the server, information for generating a corresponding base group value.

33. The method as claimed in claim 25, wherein the information of the key value assigned to each user is received from the server every time the broadcast message is sent.

34. A broadcast encryption method comprising:
receiving by first of a first group of users and a first user of a second group of users from a server first secret information generated for the first user of the first group and the first user of the second group through calculations with first key value information, and receiving by a second user of the first group of users and a second user of the second group of users from the server second secret information generated for the second user of the first group and the second user of the second group through calculations with second key value information;

receiving by the first user of the first group and the first user of the second group from the server a first inverse-base parameter value and the first key value information, and receiving by the second user of the first group and the second user of the second group a second inverse-base parameter value and the second key value information;

generating a first group key and a second group key for each group based on the first secret information and second secret information, respectively; and decrypting, by a processor of the first user of the first group and the first user of the second group, a first session key received from the server based on the first group key, and decrypting by a processor of the second user of the second group and the second user of the second group, a second session key received from the server based on the second group key, wherein a first key value is assigned to the first user of the first group and the first user of the second group and a second key value is assigned to the second user of the first group and the second user of the second group, wherein the first secret information and the second secret information are generated from a base group of unique base values, each of the base values of the base group are generated for each group from unique combinations of integers among a plurality of different integers having values greater than 1, that includes a first base value assigned to the first user of the first group and the second user of the first group and a second base value assigned to the first user of the second group and the second user of the second group, and wherein the inverse-base parameter value is generated through calculations with the integers used to generate the base group and the first and second key value information.

35. The method as claimed in claim 34, wherein a random number is assigned to each group, and the random number is used in the generating the secret information of each user to be sent to the users of each group.

36. The method as claimed in claim 35, wherein the group key for each group is generated with a random number assigned to the corresponding group.

37. The method as claimed in claim 35, wherein the server produces a random number.

38. The method as claimed in claim 37, wherein the random number is received by each user from the server.

39. The method as claimed in claim 35, wherein the base of the first secret information contains the first base value and a common integer commonly used for the first user of the first group and the second user of the first group, and the first group key is derived based on the common integer.

40. The method as claimed in claim 35, wherein users of each group receive from the server information for producing the corresponding base group.

41. The method as claimed in claim 35, wherein an exponent part and a base part are separately calculated in the generating the first inverse-base parameter value and the second inverse-base parameter value, and the exponent part and base part are received from the server.

42. The method as claimed in claim 35, wherein each group is grouped to a plurality of sub-groups, a key value is assigned to corresponding users of each sub-group, and secret information for each user is generated through calculations with key value information assigned to the corresponding users of each sub-group.

43. The method as claimed in claim 35, wherein, if there are no unauthorized users in the first group, a separate key value assigned to the first group is established as the group key for the first group.

44. The method as claimed in claim 35, wherein the key value information assigned to the users is received from the server every time the server sends the broadcast message.

45. The method as claimed in claim 34, wherein a random number assigned to a corresponding group is used in the generating the inverse-base parameter value.

46. The method as claimed in claim 34, wherein integers are coprimes.

47. The method as claimed in claim 34, wherein the first inverse-base parameter value is calculated with a random number.

48. The method as claimed in claim 47, wherein the random number is used the deriving the first group key.

49. A broadcast encryption method comprising:

generating, by a server, a first base value as a first product of a first prime integer and a common prime integer and a second base value as a product of a second prime integer and the common prime integer;

allocating a first random integer to a first user and allocating a second random integer to a second user;

generating first secret key information of the first user from the first base value exponentially modified by the first random integer and generating second secret key information of the second user from the second base value exponentially modified by the second random value;

transmitting the first secret key information to the first user and transmitting the second secret key information to the second user;

generating a first inverse-base parameter from the first base value and the first random integer and generating a second inverse-base parameter from the second base value and the second random integer;

transmitting the first inverse-base parameter to the first user and transmitting the second inverse-base parameter to the second user;

encrypting a session key based on the first secret key information and encrypting the session key based on the second secret key information; and transmitting the encrypted session key to the first user and the second user.

50. A broadcast encryption method comprising:

generating, by a server, secret key information $K_{ij}$ of n users of a group L of the n users; and transmitting, by the server, the secret key information $K_{ij}$ to the n users for calculating a group key value by eliminating a base group from the secret information $K_{ij}$, wherein $K_{ij} \equiv (O_{\sigma_{ij(1)}} \ldots O_{\sigma_{ij(d)}} O)^{zx_iy_j} (\bmod N)$, wherein $O_{\sigma_{ij}}(1), \ldots, O_{\sigma_{ij}}(d)$ is the base group produced from a combination of different prime integers, O is a prime integers different from the different prime integers, $\sigma_{ij}$ is an index of O, $x_i$ is a random number that identifies the group L, z is a random integer, $y_j$ is a distinct prime integer among the different integers, N is an RSA composite, d is a positive integer satisfying $$n < \binom{c}{d},$$

and c is a positive integer.

* * * * *